United States Patent
Hsieh et al.

(10) Patent No.: US 12,494,581 B2
(45) Date of Patent: Dec. 9, 2025

(54) LIQUID CRYSTAL ANTENNA AND METHOD OF BEAMFORMING OF ELECTROMAGNETIC WAVES

(71) Applicant: AUO Corporation, Hsin-Chu (TW)

(72) Inventors: Yi-Chen Hsieh, Hsin-Chu (TW); Yi-Hsiang Lai, Hsin-Chu (TW); Ching-Huan Lin, Hsin-Chu (TW)

(73) Assignee: AUO Corporation, Hsin-Chu (TW)

( * ) Notice: Subject to any disclaimer, the term of this patent is extended or adjusted under 35 U.S.C. 154(b) by 112 days.

(21) Appl. No.: 18/536,295

(22) Filed: Dec. 12, 2023

(65) Prior Publication Data
US 2025/0079710 A1 Mar. 6, 2025

(30) Foreign Application Priority Data
Sep. 6, 2023 (TW) .................. 112133928

(51) Int. Cl.
*H01Q 21/06* (2006.01)
*G02F 1/13* (2006.01)
(Continued)

(52) U.S. Cl.
CPC ......... *H01Q 9/0414* (2013.01); *G02F 1/1313* (2013.01); *H01Q 1/48* (2013.01);
(Continued)

(58) Field of Classification Search
CPC ........ H01Q 1/38; H01Q 1/48; H01Q 3/30–34; H01Q 9/0414–0457; H01Q 21/00; H01Q 21/065
See application file for complete search history.

(56) References Cited

U.S. PATENT DOCUMENTS 10,862,219 B2 * 12/2020 Haziza ................. H01Q 1/38
2011/0156946 A1 6/2011 Margomenos
(Continued)

FOREIGN PATENT DOCUMENTS

| CN | 204333243 U | 5/2015 |
|---|---|---|
| CN | 110707427 A | 1/2020 |

(Continued)

OTHER PUBLICATIONS

N.C. Papanicolaou et al., Frequency-agile microstrip patch antenna on a biased liquid crystal substrate, Electronics Letters, Feb. 2015, DOI: 10.1049/el.2014.3856 (ref.01, file attached).

*Primary Examiner* — Hasan Islam
(74) *Attorney, Agent, or Firm* — WPAT, PC

(57) ABSTRACT

A liquid crystal antenna and a method of beamforming of electromagnetic waves are provided. The method includes: receiving by a feeding circuit board a feeding signal to form a feeding electromagnetic wave; applying a plurality of bias voltages respectively between a ground plane and a plurality of patch antenna units of a liquid crystal modulation structure to form an amplitude interference pattern, wherein a liquid crystal layer of the liquid crystal modulation structure is disposed between the ground plane and the patch antenna units; and utilizing interference of the feeding electromagnetic wave and the amplitude interference pattern to form an electromagnetic beam, wherein the electromagnetic beam is directed to a specific angle, and an intensity and the specific angle of the electromagnetic beam are modulated according to the variations of the feeding electromagnetic wave and the amplitude interference pattern.

9 Claims, 18 Drawing Sheets

(51) Int. Cl.
  *H01Q 1/48*    (2006.01)
  *H01Q 3/34*    (2006.01)
  *H01Q 9/04*    (2006.01)

(52) U.S. Cl.
  CPC ............. *H01Q 3/34* (2013.01); *H01Q 9/0457* (2013.01); *H01Q 21/065* (2013.01)

(56) References Cited

U.S. PATENT DOCUMENTS

| | | |
|---|---|---|
| 2020/0243974 A1 | 7/2020 | Hsieh et al. |
| 2020/0373672 A1 | 11/2020 | Paulotto et al. |
| 2020/0388912 A1 | 12/2020 | Sudo et al. |
| 2021/0175638 A1 | 6/2021 | Povalac et al. |
| 2023/0275352 A1* | 8/2023 | Park .................. H01Q 9/045 |

FOREIGN PATENT DOCUMENTS

| | | |
|---|---|---|
| CN | 113036455 A | 6/2021 |
| TW | 202029577 A | 8/2020 |
| TW | 202245333 A | 11/2022 |

* cited by examiner

LIQUID CRYSTAL ANTENNA AND METHOD OF BEAMFORMING OF ELECTROMAGNETIC WAVES

RELATED APPLICATIONS

This application claims priority to Taiwan Application Serial Number 112133928, filed Sep. 6, 2023, which is herein incorporated by reference.

BACKGROUND

Technical Field

The present disclosure relates to a liquid crystal antenna and a method of beamforming of electromagnetic waves, and particularly relates to a liquid crystal antenna capable of radiating electromagnetic beams and a method of beamforming of electromagnetic waves.

Description of Related Art

Current manners of monitoring human physiological information can be roughly divided into contact methods or non-contact methods. The contact methods usually involve invading the human body to obtain physiological information. Some non-contact methods will use optical sensing, such as cameras with red or green light, to obtain human physiological information. Since contact devices need to contact or invade the human body, a tested person may feel uncomfortable. When optical sensing is used, the camera, sometimes, will capture face information of a tested person, which results in derivational privacy issues.

SUMMARY

At least one embodiment of the present disclosure provides a liquid crystal antenna capable of radiating electromagnetic beams that can scan users and thus are suitable for monitoring physiological information of the users.

The liquid crystal antenna includes a feeding circuit board and a liquid crystal modulation structure. The feeding circuit board includes a plurality of traces. The traces form a plurality of feeding transmission paths. The liquid crystal modulation structure is disposed on the feeding circuit board and includes a ground plane, a plurality of patch antenna units and a liquid crystal layer. The ground plane is disposed adjacent to the feeding circuit board and includes a plurality of slotted holes. Each of the patch antenna units includes two patch antennas that overlap the slotted holes respectively in a vertical projection direction of the ground plane and correspond to the feeding transmission paths respectively. In each of the patch antenna units, the two feeding transmission paths corresponding to the two patch antennas extend in opposite directions to their respective tail ends, and the two feeding transmission paths are identical in length. The liquid crystal layer is disposed between the ground plane and the patch antenna units, and has a liquid crystal dielectric value. The liquid crystal dielectric value varies according to a voltage difference between each of the patch antenna units and the ground plane. When the feeding circuit board receives a feeding signal to form a feeding electromagnetic wave, and the patch antenna units receive a plurality of bias voltages respectively so that the liquid crystal modulation structure forms an amplitude interference pattern, energy of the feeding signal is coupled to the liquid crystal modulation structure so that the feeding electromagnetic wave and the amplitude interference pattern interfere to form an electromagnetic beam. The electromagnetic beam is directed to a specific angle. An intensity and the specific angle of the electromagnetic beam are modulated according to variations of the feeding electromagnetic wave and the amplitude interference pattern.

In at least one embodiment of the present disclosure, in each of the patch antenna units, a center distance is present between centers of the patch antennas. The electromagnetic beam has a wavelength, and the center distance is 0.25-0.35 times the wavelength.

In at least one embodiment of the present disclosure, the patch antenna units are arranged above the ground plane in a first direction and a second direction perpendicular to the first direction. A unit center distance is present between centers of adjacent two of the patch antenna units. The electromagnetic beam has a wavelength. The unit center distance is 0.5-0.8 times the wavelength.

In at least one embodiment of the present disclosure, the slotted holes are arranged in the first direction and the second direction. Each of the slotted holes is rectangular. A length of an edge, parallel to the first direction, of each of the slotted holes is 0.138-0.169 times the wavelength and a length of an edge, parallel to the second direction, of each of the slotted holes is 0.016-0.021 times the wavelength. Each of the patch antennas is rectangular and overlaps a center of a corresponding one of the slotted holes. A length of an edge, parallel to the first direction, of each of the patch antennas is 0.013-0.018 times the wavelength and a length of an edge, parallel to the second direction, of each of the patch antennas is 0.025-0.032 times the wavelength.

In at least one embodiment of the present disclosure, the traces include a first trace, a plurality of second traces and a plurality of third traces. The first trace extends from a boundary of the feeding circuit board to a feeding point of the feeding circuit board. One end of each of the second traces is connected to the first trace from the feeding point, each of the second traces extends at least partially in a direction away from the feeding point, and other end of each of the second traces is connected to two of the third traces. Each of the third traces has two branches to form tail ends of the two feeding transmission paths, and corresponds to one of the patch antenna units, where transmission paths of the two branches of each of the third traces are identical in length.

In at least one embodiment of the present disclosure, transmission paths of the second traces are identical in length, and transmission paths of the third traces are identical in length. The feeding transmission paths are identical in length. The feeding signal is divided into a plurality of branch signals through the feeding transmission paths. The branch signals form a plurality of electromagnetic waves respectively, and the electromagnetic waves are identical in amplitude and phase.

In at least one embodiment of the present disclosure, transmission paths of the second traces are identical in length. Each of the third traces further has a curved segment, where the curved segment is connected to the corresponding second trace, and the branches are connected to the curved segment. A length of each of the feeding transmission paths is proportional to a radius distance between the tail end of the feeding transmission path and the feeding point. The feeding signal is divided into a plurality of branch signals through the feeding transmission paths. The branch signals form a plurality of electromagnetic waves respectively. In the feeding transmission paths, the electromagnetic waves formed corresponding to the radius distances that are identical in length are identical in amplitude and phase.

In at least one embodiment of the present disclosure, the liquid crystal antenna further includes a plurality of transistors and a plurality of bias traces. The transistors are electrically connected to the patch antennas and the bias traces respectively. The bias voltages are transmitted to the corresponding patch antenna units respectively through at least part of the bias traces and at least part of the transistors that are turned on.

In at least one embodiment of the present disclosure, the liquid crystal antenna further includes a plurality of bias traces. The bias traces are electrically connected to the patch antennas respectively. The bias voltages are transmitted to the corresponding patch antenna units respectively through at least part of the bias traces.

At least one embodiment of the present disclosure provides a method of beamforming of electromagnetic waves, and formed electromagnetic waves can scan users and thus are suitable for monitoring physiological information of the users.

The method of beamforming of electromagnetic waves provided by at least one embodiment of the present disclosure includes: receiving by a feeding circuit board a feeding signal to form a feeding electromagnetic wave; applying a plurality of bias voltages between a ground plane and a plurality of patch antenna units of a liquid crystal modulation structure respectively to form an amplitude interference pattern, where a liquid crystal layer of the liquid crystal modulation structure is disposed between the ground plane and the patch antenna units and has a liquid crystal dielectric value varying according to a voltage difference between each of the patch antenna units and the ground plane, each of the patch antenna units comprises two patch antennas, where the patch antennas overlap a plurality of slotted holes of the ground plane respectively in a vertical projection direction of the ground plane, and a phase difference between an electric field radiation generated by the liquid crystal modulation structure corresponding to one of the patch antennas and an electric field radiation generated by the liquid crystal modulation structure corresponding to the other of the patch antennas is 160-200 degrees; and utilizing interference of the feeding electromagnetic wave and the amplitude interference pattern to form an electromagnetic beam, where the electromagnetic beam is directed to a specific angle, and an intensity and the specific angle of the electromagnetic beam are modulated according to the variations of the feeding electromagnetic wave and the amplitude interference pattern.

In at least one embodiment of the present disclosure, a plurality of feeding transmission paths of the feeding circuit board are identical in length. The feeding signal is divided into a plurality of branch signals through the feeding transmission paths, and the branch signals form a plurality of electromagnetic waves respectively. The electromagnetic waves are identical in amplitude and phase.

In at least one embodiment of the present disclosure, a plurality of feeding transmission paths of the feeding circuit board are branched from a feeding point, and a length of each of the feeding transmission paths is proportional to a radius distance between the tail end of the feeding transmission path and the feeding point. The feeding signal is divided into a plurality of branch signals through the feeding transmission paths, and the branch signals form a plurality of electromagnetic waves respectively. In the feeding transmission paths, the electromagnetic waves formed corresponding to the radius distances that are identical in length are identical in amplitude and phase.

Based on the above, the liquid crystal antenna disclosed in the above embodiments can be controlled to achieve beamforming of electromagnetic waves to scan intensively in a direction of the specific angle.

BRIEF DESCRIPTION OF THE DRAWINGS

For a more complete understanding of embodiments and their advantages, the description below is made with reference to the drawings.

DETAILED DESCRIPTION

Figure 1:
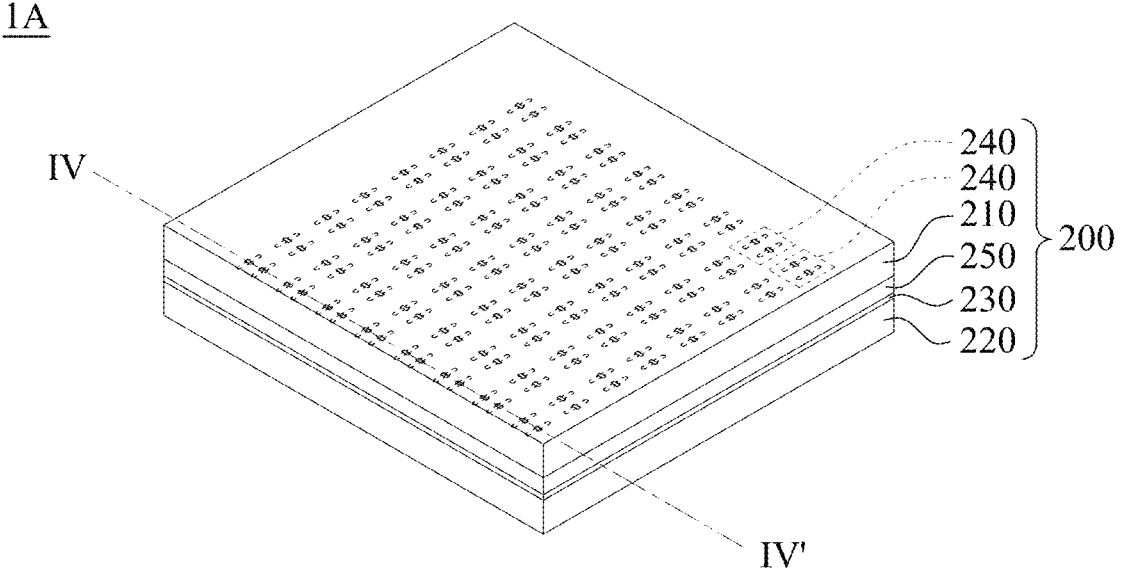
FIG. 1 is a stereoscopic exploded view of a liquid crystal antenna according to at least one embodiment of the present disclosure.
Figure 1:
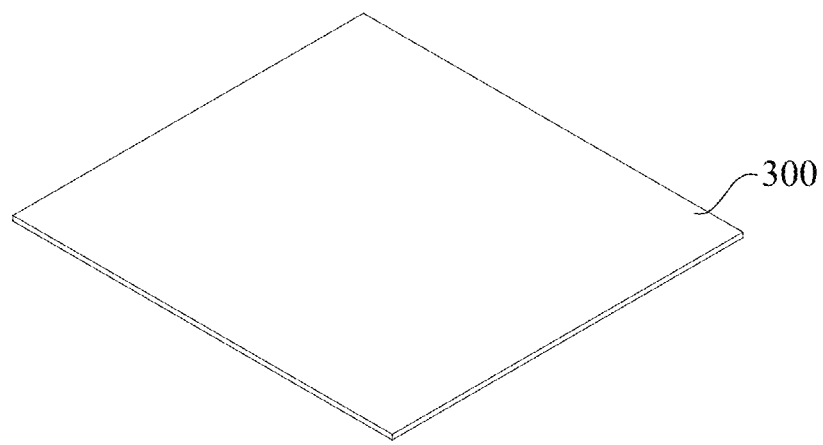
Figure 1:
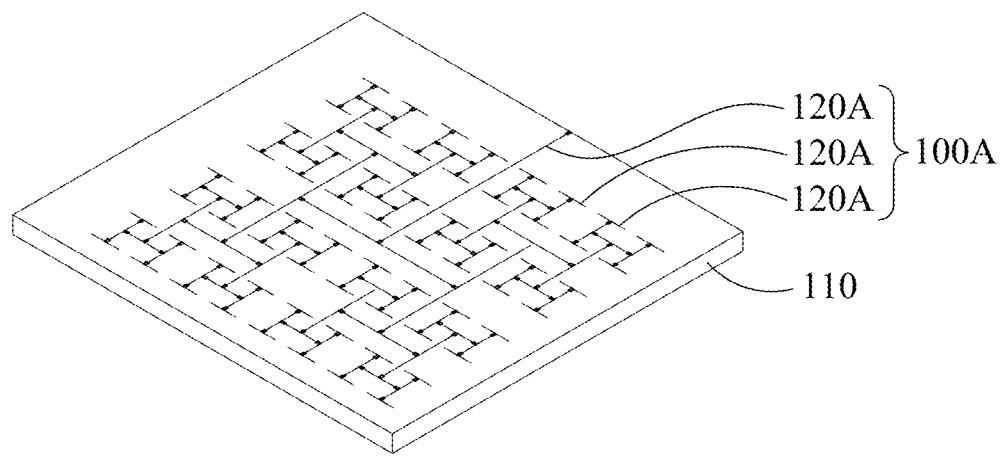

For clearly introducing the technical features of the present application below, the dimensions (such as length, width, thickness, and depth) of components (such as layers, membranes, substrates, and areas) in the figures will be scaled up disproportionately, and the number of some components will be reduced. Accordingly, the description and interpretation of the embodiments below shall not be limited to the number of components and the dimensions and shapes of the components shown in the figures, but shall encompass dimensions, shapes and deviations therebetween as a result of actual manufacturing processes and/or tolerances. For example, a flat surface shown in a figure may have a feature of roughness and/or nonlinearity, while an acute angle shown in a figure may be circular. Therefore, the components shown in the present application are mainly used for schematic purposes, and are not intended to accurately depict the actual shapes of the components, nor are they used to limit the claims of the patent application.

Secondly, the words "about", "approximately" or "substantially" appearing herein encompass not only clearly recorded values and ranges of values, but also allowable deviation ranges understood by persons of ordinary skill in the art, in which the deviation ranges may be determined by errors resulting from measurements, and the errors are due, for example, to limitations of both a measuring system and process conditions. For example, two objects (such as a plane or a trace of a substrate) are "substantially parallel" or "substantially vertical", where "substantially parallel" and "substantially vertical" respectively represent that the parallelism and perpendicularity between the two objects may contain non-parallelism and non-perpendicularity caused by the allowable deviation ranges.

In addition, the word "about" can mean within one or more standard deviations of the above values, such as ±30%, ±20%, ±10% or ±5%. The terms "about", "approximately" or "substantially" and the like used in the present application may be used to select acceptable deviation ranges or standard deviations based on optical, etchable, mechanical or other properties, rather than a single standard deviation to apply all of the above optical, etchable, mechanical or other properties.

Spatially relative terms used in the present disclosure, such as "under", "below", "above", "over", are used to facilitate the description of a relative relationship between one component or feature and another component or feature, as shown in the figures. The real meaning of the spatially relative terms involves other orientations. For example, when turning upside down and downside up at 180 degrees, the relationship between one component and another may change from "under" and "below" to "above" and "over". In addition, spatially relative statements used in the present disclosure shall be similarly interpreted.

In addition, the present disclosure may be implemented or applied by means of other different specific embodiments, the details of the present disclosure may be based on different viewpoints and applications, and various embodiments can be combined, modified and changed without deviating from the idea of the present disclosure.

FIG. 1 is a stereoscopic exploded view of a liquid crystal antenna 1A according to at least one embodiment of the present disclosure. Referring to FIG. 1, the liquid crystal antenna 1A includes a feeding circuit board 100A, a liquid crystal modulation structure 200 and an adhesion layer 300. The feeding circuit board 100A forms a feeding electromagnetic wave when receiving a feeding signal, and the energy of the feeding signal is coupled to the liquid crystal modulation structure 200 so that the liquid crystal antenna 1A radiates electromagnetic beams. The electromagnetic beams radiated by the liquid crystal antenna 1A can scan intensively a user to monitor the user's physiological information.

The feeding circuit board 100A includes a dielectric layer 110 and a plurality of traces 120A, where the traces 120A are disposed on the dielectric layer 110. The liquid crystal modulation structure 200 includes two substrates 210 and 220 disposed opposite to each other, a ground plane 230, a plurality of patch antenna units 240, and a liquid crystal layer 250. The ground plane 230 is disposed on the substrate 220, and the patch antenna units 240 are disposed on the other substrate 210. The liquid crystal layer 250 is disposed between the ground plane 230 and the patch antenna units 240.

The adhesion layer 300 is arranged between the dielectric layer 110 of the feeding circuit board 100A and the substrate 220 of the liquid crystal modulation structure 200, and configured to adhere the feeding circuit board 100A to the liquid crystal modulation structure 200 so that the radiation energy fed by the feeding circuit board 100A can be coupled to the liquid crystal modulation structure 200 in an impedance-matched manner. It will be appreciated that the traces 120A are arranged on the side of the dielectric layer 110 opposite to the adhesion layer 300, that is, the traces 120A are disposed on the bottom surface of the dielectric layer 110 in FIG. 1, and the patch antenna units 240 are arranged on the side of the substrate 210 adjacent to the liquid crystal layer 250. So, in actual situations, the traces 120A in FIG. 1 will be covered by the dielectric layer 110, and the patch antenna units 240 in FIG. 1 will be covered by the substrate 210. However, for clear displaying, the traces 120A and the patch antenna units 240 are shown in solid lines.

Figure 2A:
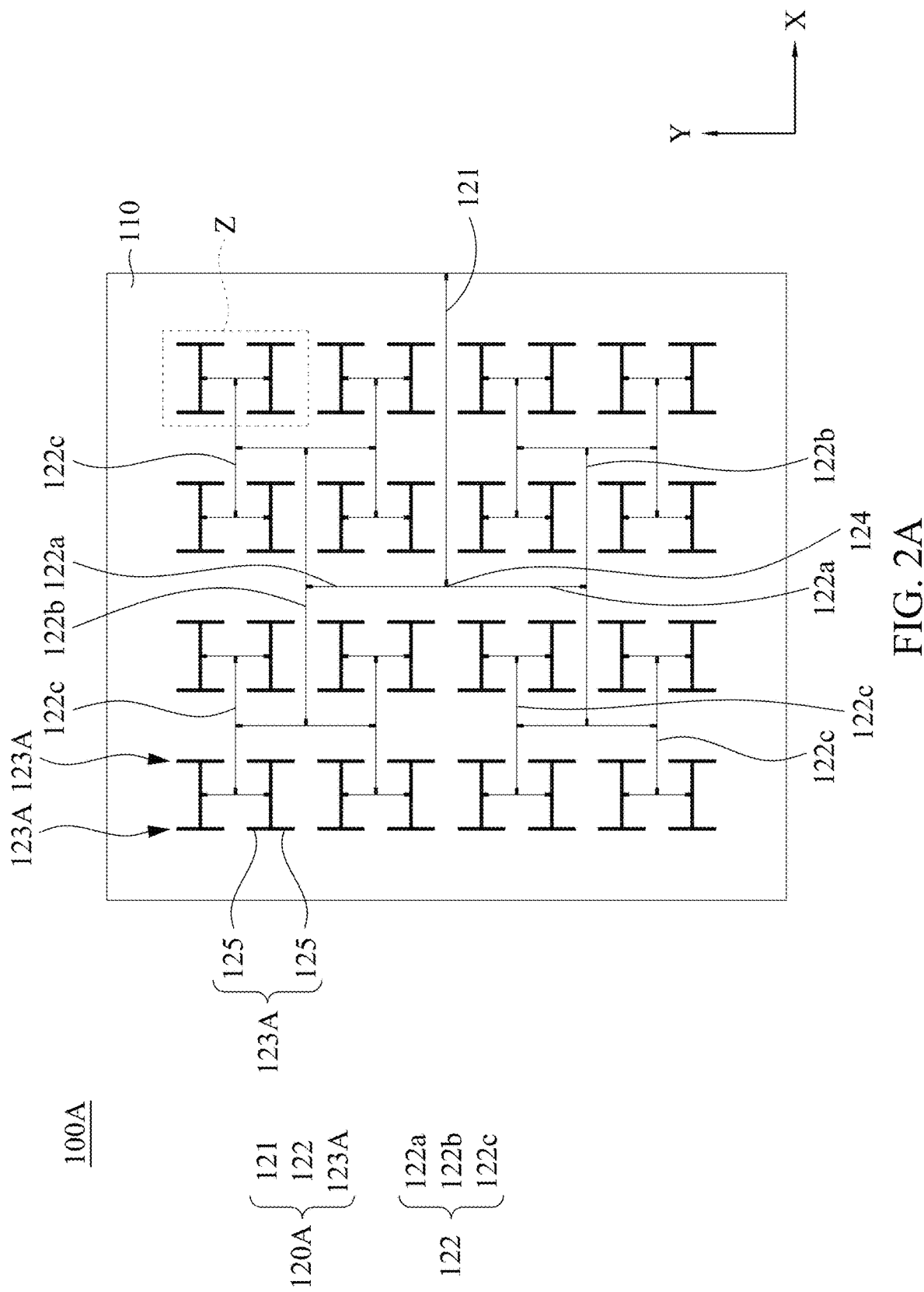
FIG. 2A is a top view of a feeding circuit board in FIG. 1.

FIG. 2A is a top view of the feeding circuit board 100A in FIG. 1, in which the traces 120A are shown in solid lines for clear displaying. Referring to FIG. 1 and FIG. 2A, the traces 120A of the feeding circuit board 100A form a plurality of feeding transmission paths. The traces 120A include a first trace 121, a plurality of second traces 122 and a plurality of third traces 123A. The first trace 121 extends from a boundary of the feeding circuit board 100A to a feeding point 124 of the feeding circuit board 100A, and in FIGS. 1 and 2A, the first trace 121 is straight-line-shaped. The first trace 121 is configured to receive a feeding signal from a radio frequency integrated circuit (RFIC) outside the feeding circuit board 100A and transmits the feeding signal to the feeding point 124, where the RFIC may be a millimeter wave integrated circuit (MMIC), In this example, the feeding point 124 is at the center of the feeding circuit board 100A.

One end of each of the second traces 122 is connected from the feeding point 124 to the first trace 121 and the other end of each of the second traces 122 is connected to two of the third traces 123A. Each of the second traces 122 has a branched segment 122a and a plurality of connecting segments 122b and 122c. In FIG. 2A, two second traces 122 are presented, and each of the second traces 122 is illustrated by five connecting segments 122b and 122c. In each of the second traces 122, the branched segment 122a extends in a direction away from the feeding point 124. Each of the connecting segments 122b and 122c is I-shaped and parallel to a direction X and a direction Y, where the direction X is perpendicular to the direction Y. In each of the second traces 122, the connecting segment 122b connected to the branched segment 122a is connected to the four connecting segments 122c. Four endpoints of each of the connecting segments 122c are separately connected to two third traces 123A. The transmission paths of the second traces 122 to transmit the feeding signal are identical in length. It should be added that when the transmission path of each of the second traces 122 needs to be expanded, four endpoints of each of the connecting segments 122c are further separately connected to one connecting segment 122c.

Each of the third traces 123A has two branches 125 and is T-shaped. To clearly show the third traces 123A, the third traces 123A in FIG. 2A are shown in bold lines. The transmission paths of the two branches 125 of each of the third traces 123A to transmit the feeding signal are identical in length, and the extension directions of the branches 125 are parallel to the electric field direction of the feeding electromagnetic wave. In this example, the electric field direction of the feeding electromagnetic wave is set to be parallel to the direction Y. Two third traces 123A connected to each of the second traces 122 are arranged in a mirror-oriented manner. In the feeding circuit board 100A, the transmission paths of the third traces 123A to transmit the feeding signal are identical in length.

Figure 2B:
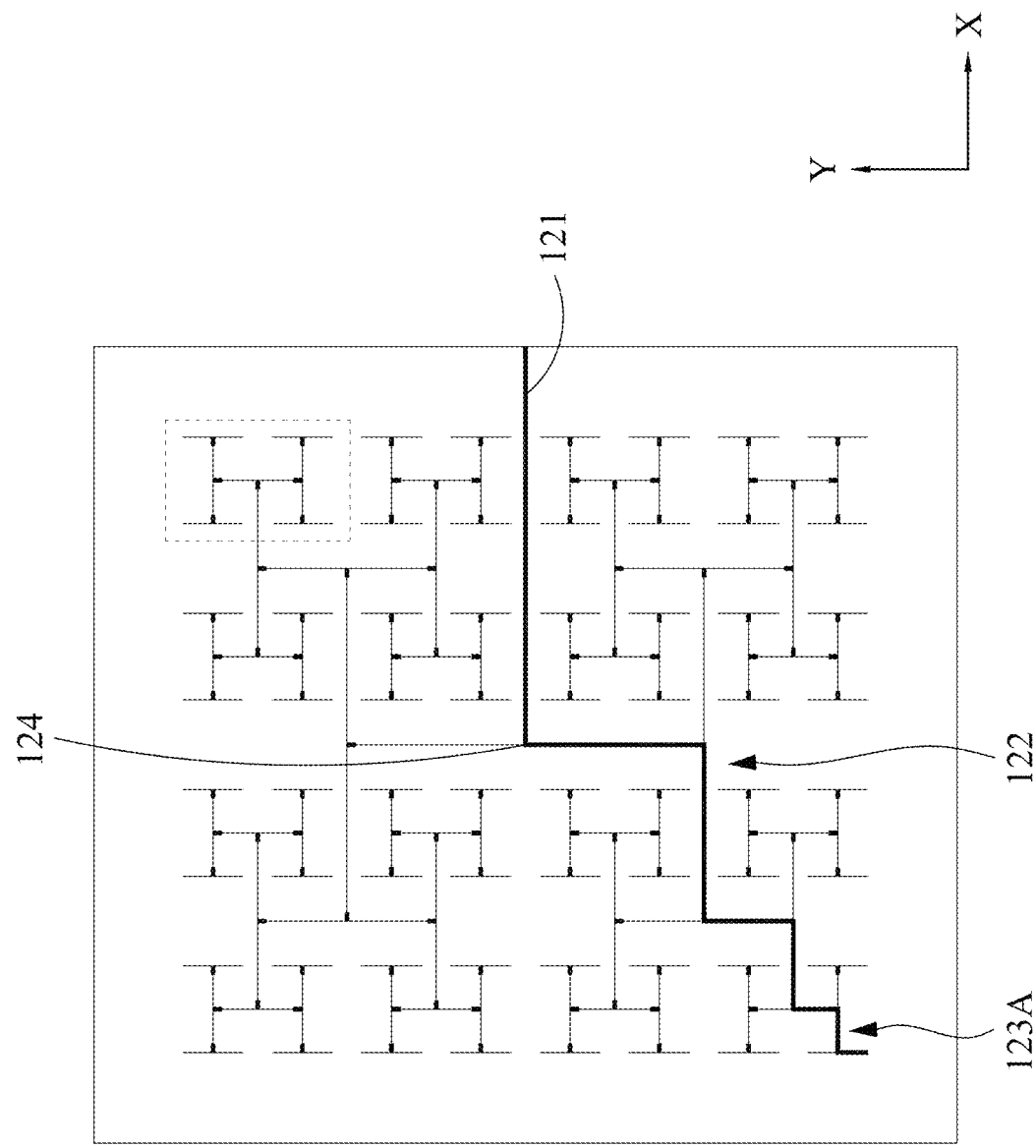
FIG. 2B is a schematic diagram of the feeding circuit board in FIG. 1, in which one of feeding transmission paths is bold.

FIG. 2B is a schematic diagram of the feeding circuit board in FIG. 1, in which one of the feeding transmission paths is bold. Referring to FIGS. 2A and 2B, each of the feeding transmission paths corresponds to the first trace 121, one of the second traces 122 and one of the branches 125 of the third traces 123A corresponding to the second trace 122.

Thus, the feeding signal is transmitted via the first trace 121 to the feeding point 124, and via the second traces 122 to the branch 125 of the third trace 123A. That is, the feeding transmission paths are branched from the feeding point 124. Since the transmission paths of the second traces 122 are identical in length, and the transmission paths of the branches 125 of the third traces 123A are identical in length, the transmission paths of the feeding circuit board 100A are all identical in length. The feeding signal is divided into a plurality of branch signals through the feeding transmission paths. The branch signals form a plurality of electromagnetic waves respectively, and the electromagnetic waves are identical in amplitude and phase. That is, the feeding electromagnetic wave is divided equally into a plurality of electromagnetic waves.

It should be added that the traces 120A of the feeding circuit board 100A may be of a microstrip feeding structure or a stripline feeding structure, and there is no limit. In this example, the traces 120A are of the microstrip feeding structure, where a ground layer of the feeding circuit board 100A is shared with the ground plane 230 of the liquid crystal modulation structure 200.

Figure 3:
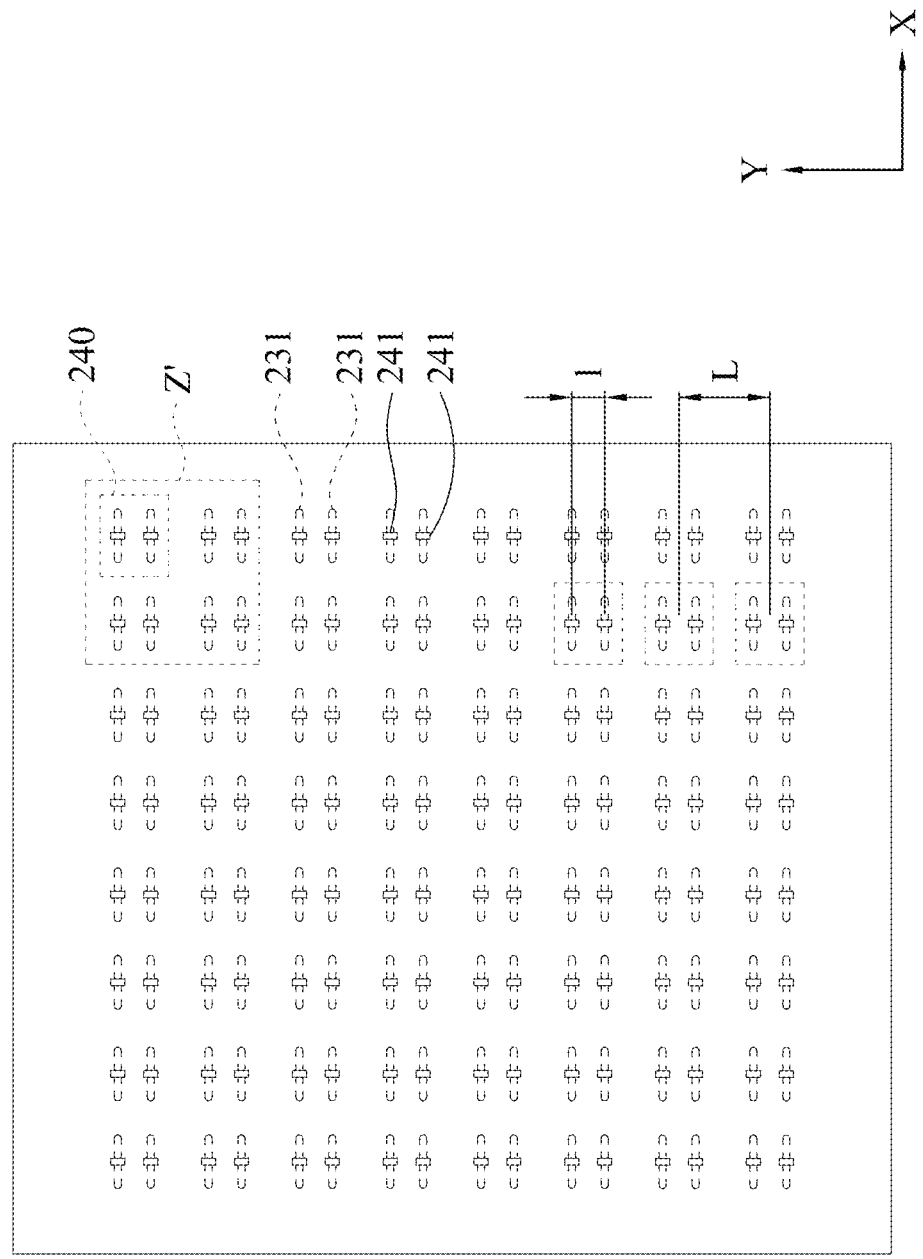
FIG. 3 is a top view of a liquid crystal modulation structure in FIG. 1.
Figure 4:
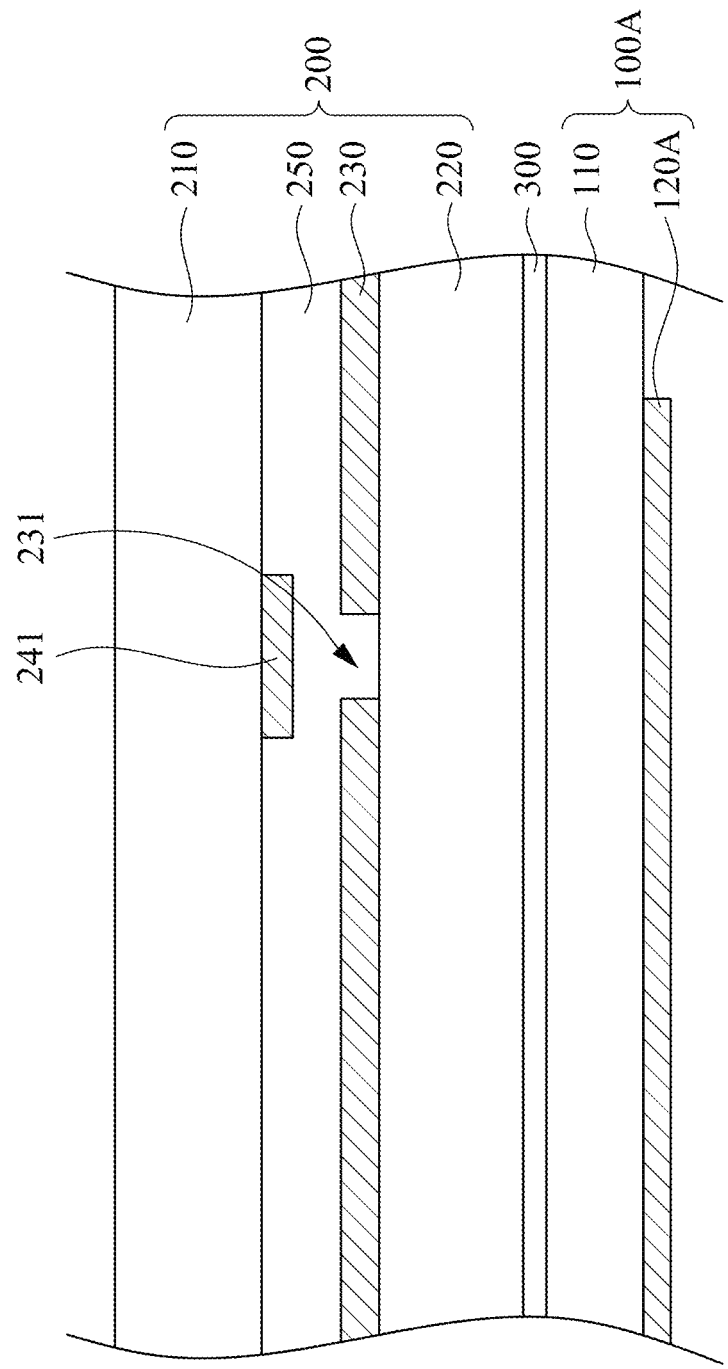
FIG. 4 is a section view of the liquid crystal antenna along an IV IV' line in FIG. 1 according to at least one embodiment of the present disclosure.

FIG. 3 is a top view of the liquid crystal modulation structure 200 in FIG. 1, in which the patch antenna units 240 are shown in solid lines for clear displaying. FIG. 4 is a section view of the liquid crystal antenna along an IV IV' line according to at least one embodiment of the present disclosure, where FIG. 4 corresponds to only one patch antenna 241. Referring to FIGS. 1, 3, and 4, the ground plane 230 is adjacent to the feeding circuit board 100A. The ground plane 230 includes a plurality of slotted holes 231. The slotted holes 231 are arranged in the direction X and the direction Y. Each of the slotted holes 231 is rectangular. In this example, each of the slotted holes 231 is, for example, in a shape of a rounded rectangle. The size of each of the slotted holes 231 is related to a wavelength of an electromagnetic beam. A length of an edge, parallel to the direction X, of each of the slotted holes 231 is 0.138-0.169 times the wavelength and a length of an edge, parallel to the direction Y, of each of the slotted holes 231 is 0.016-0.021 times the wavelength.

The patch antenna units 240 are also arranged above the ground plane 230 in the direction X and the direction Y. A unit center distance L is present between the centers of adjacent two of the patch antenna units. The size of the unit center distance L is also related to the wavelength of the electromagnetic beam. Further, the unit center distance L is 0.5-0.8 times the wavelength.

Each of the patch antenna units 240 includes two patch antennas 241, where the patch antennas 241 are spaced apart, and a center distance I is present between the centers of the patch antennas 241. The size of the center distance I is also related to the wavelength of the electromagnetic beam. Further, the center distance I is 0.25-0.35 times the wavelength. The patch antennas 241 overlap the slotted holes 231 respectively in a vertical projection direction of the ground plane 230. Therefore, the number of the patch antennas 241 is the same as that of the slotted holes 231. Each of the patch antennas 241 is rectangular and overlaps the center of the corresponding one of the slotted holes 231. The size of each of the patch antennas 241 is also related to the wavelength of the electromagnetic beam, where a length of an edge, parallel to the direction X, of each of the patch antennas 241 is 0.013-0.018 times the wavelength and a length of an edge, parallel to the direction Y, of each of the patch antennas 241 is 0.025-0.032 times the wavelength.

Figure 5:
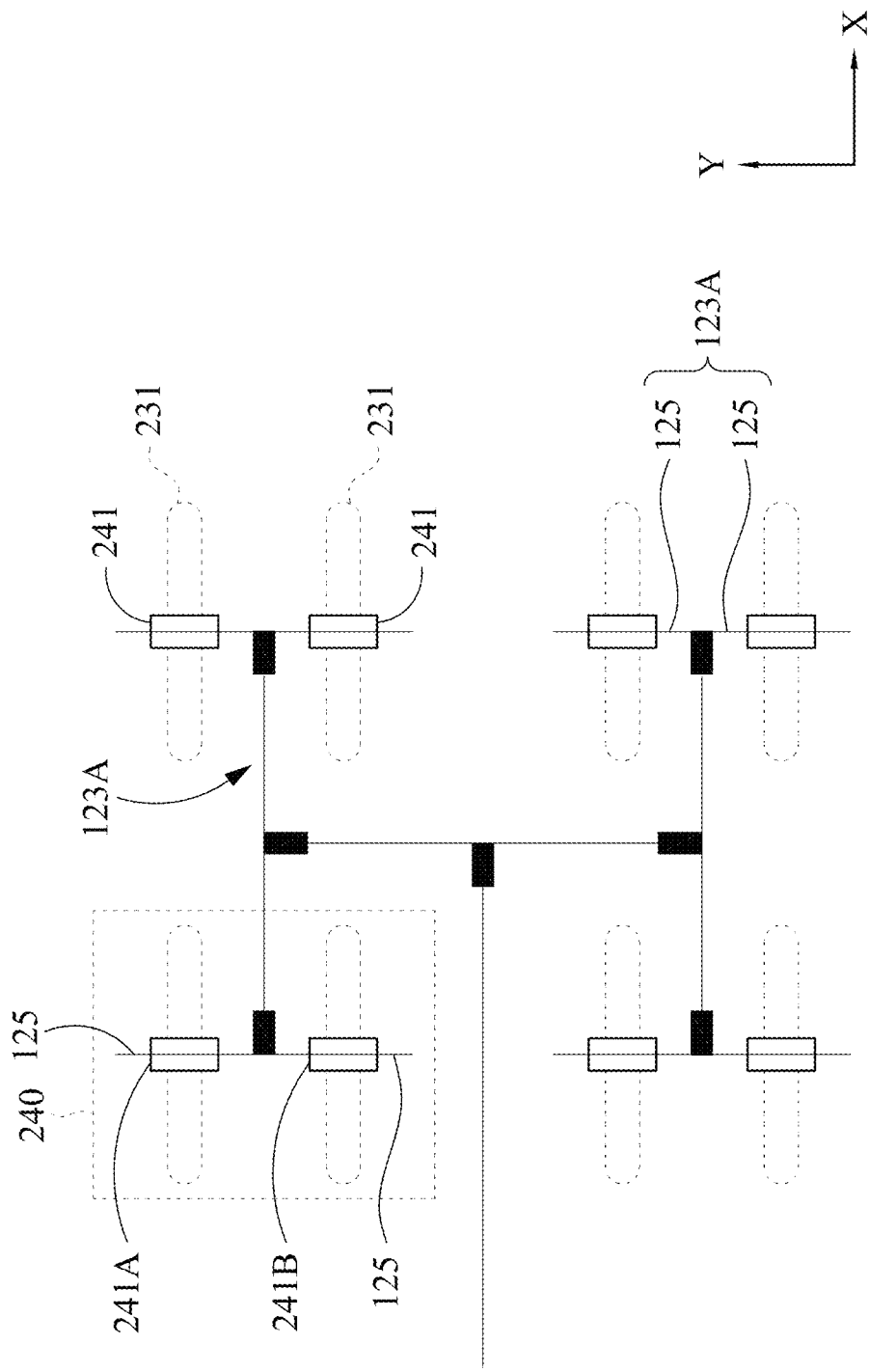
FIG. 5 is a schematic diagram of an overlap between a zone Z of the feeding circuit board in FIG. 2A and a zone Z' of the liquid crystal modulation structure in FIG. 3.

FIG. 5 is a schematic diagram of an overlap between a zone Z of the feeding circuit board 100A in FIG. 2A and a zone Z' of the liquid crystal modulation structure 200 in FIG. 3. Referring to FIGS. 2A, 3, and 5, the patch antennas 241 overlap the slotted holes 231, and correspond to the feeding transmission paths respectively. That is, the patch antennas 241 correspond to the branches 125 of the third traces 123A respectively. In each of the patch antenna units 240, the two feeding transmission paths corresponding to the two patch antennas 241 extend in opposite directions to their respective tail ends, and the lengths of the two feeding transmission paths are identical. That is, the branches 125 corresponding to the two patch antennas 241 respectively extend in different directions, where one branch 125 extends in the direction Y and the other branch 125 extends in the opposite direction Y. The energy of the feeding electromagnetic wave of the feeding circuit board 100A is uniformly coupled to the patch antenna units 240 and coupled to two patch antennas 241 of each of the patch antenna units 240.

In each of the patch antenna units 240, a phase difference between an electric field radiation generated by the liquid crystal modulation structure 200 corresponding to one of the patch antennas 241 and an electric field radiation generated by the liquid crystal modulation structure 200 corresponding to the other of the patch antennas 241 is 160-200 degrees, such as 180 degrees. For example, in each of the patch antenna units 240, one of the patch antennas 241, the corresponding slotted hole 231, the ground plane 230 and the liquid crystal layer 250 generate a first electric field radiation, while the other one of the patch antennas 241, the corresponding slotted hole 231, the ground plane 230 and the liquid crystal layer 250 generate a second electric field radiation. There is a phase difference of 180 degrees between the first electric field radiation and the second electric field radiation.

Figure 6:
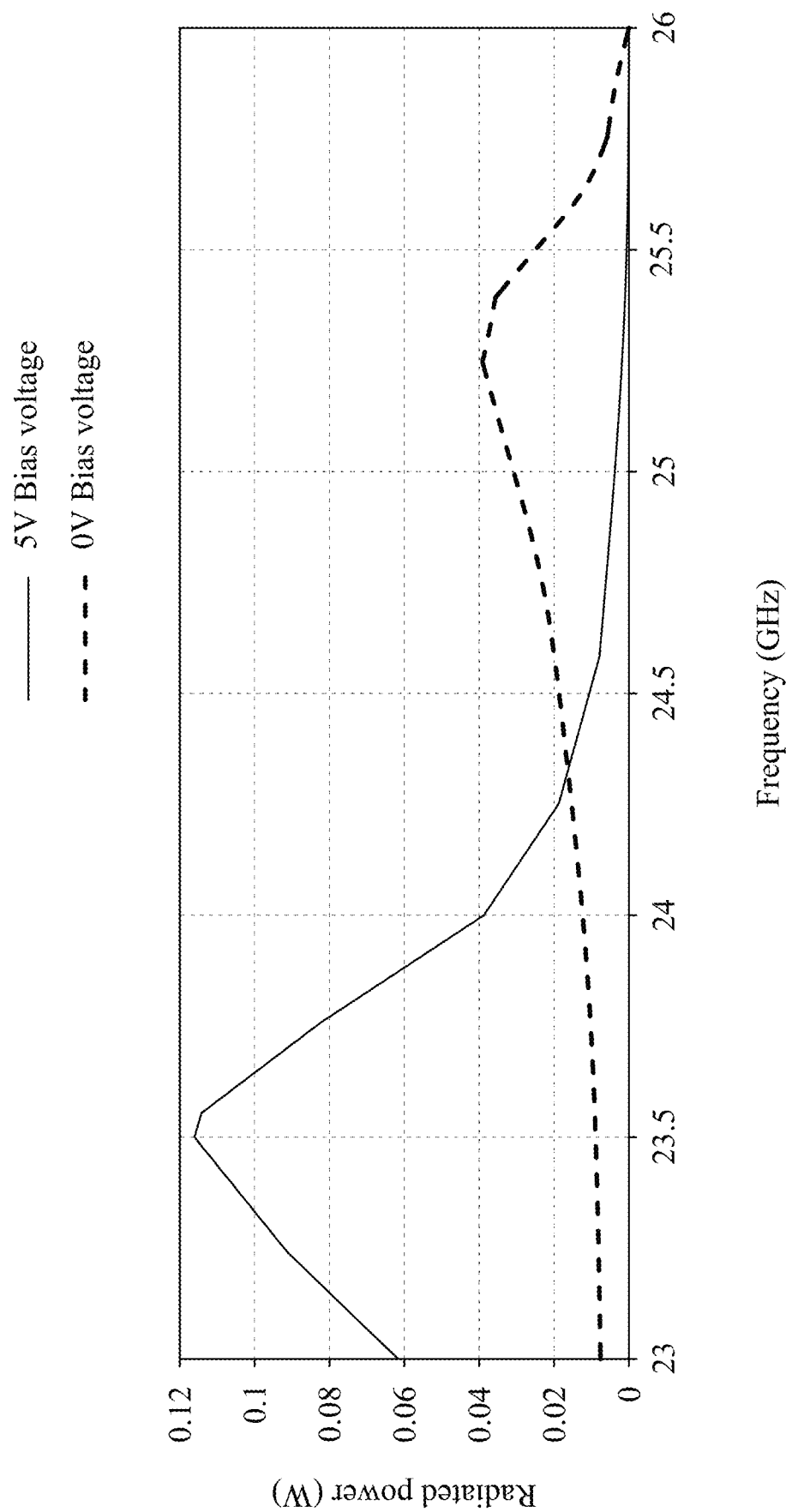
FIG. 6 is a simulated diagram of a frequency corresponding to radiated power of a patch antenna.

FIG. 6 is a simulated diagram of a frequency corresponding to radiated power of the patch antenna 241. Referring to FIGS. 1, 4, and 6, the liquid crystal layer 250 is disposed between the ground plane 230 and the patch antenna units 240 and in the slotted holes 231. The liquid crystal layer 250 has a liquid crystal permittivity. The liquid crystal permittivity of the liquid crystal layer 250 disposed between each of the patch antenna units 240 and the ground plane 230 varies with a voltage difference between each of the patch antenna units 240 and the ground plane 230. Variations of the liquid crystal permittivity then affect the resonant frequencies and radiated powers of the patch antenna units 240.

As shown in FIG. 6, when a bias voltage of 5 volts is applied between an individual patch antenna 241 and the ground plane 230, the radiated power generated by the patch antenna 241, the corresponding slotted hole 231, the ground plane 230 and the liquid crystal layer 250 at 23.5 GHz is 0.1156 watts; and when a bias voltage of 0 volts (no bias voltage) is applied between the individual patch antenna 241 and the ground plane 230, the radiated power generated by the patch antenna 241, the corresponding slotted hole 231, the ground plane 230 and the liquid crystal layer 250 at 23.5 GHz is 0.0085 watts. That is, by applying the bias voltage between the patch antenna 241 and the ground plane 230, the liquid crystal modulation structure 200 can be controlled to achieve, for example, 92.6% ((0.1156-0.0085)/0.1156) of the radiated power modulation. In addition, the feeding circuit board 100A is of a circuit board feeding structure, and the slotted holes 231 of the ground plane 230 and the patch antennas 241 are subjected to energy coupling to achieve resonance, so that the liquid crystal layer 250 of the liquid crystal antenna 1A will be thinned (less than 10 microns), that is achieved, an extremely high radiated power modulation, and the use of a standard manufacturing process for a liquid crystal display (LCD) to make array antennas is facilitated.

In addition, the thickness and permittivity of each layer of materials of the liquid crystal antenna 1A will also affect the impedance matching of the feeding energy. The thickness and relative permittivity of the following structures can achieve a good impedance matching of the feeding energy. The thickness of the substrate 210 is 0.1-1 mm, and the relative permittivity of the substrate 210 is 4-6; the thickness of the liquid crystal layer 250 is 0.002-0.01 mm, and the relative permittivity of the liquid crystal layer 250 is 2-4; the thickness of the substrate 220 is 0.1-0.5 mm, and the relative permittivity of the substrate 220 is 4-6; the thickness of the adhesion layer 300 is 0.05-0.1 mm, and the relative permittivity of the adhesion layer 300 is 2-5; and the thickness of the dielectric layer 110 is 0.1-0.5 mm and the relative permittivity of the dielectric layer 110 is 3-4.

Figure 7:
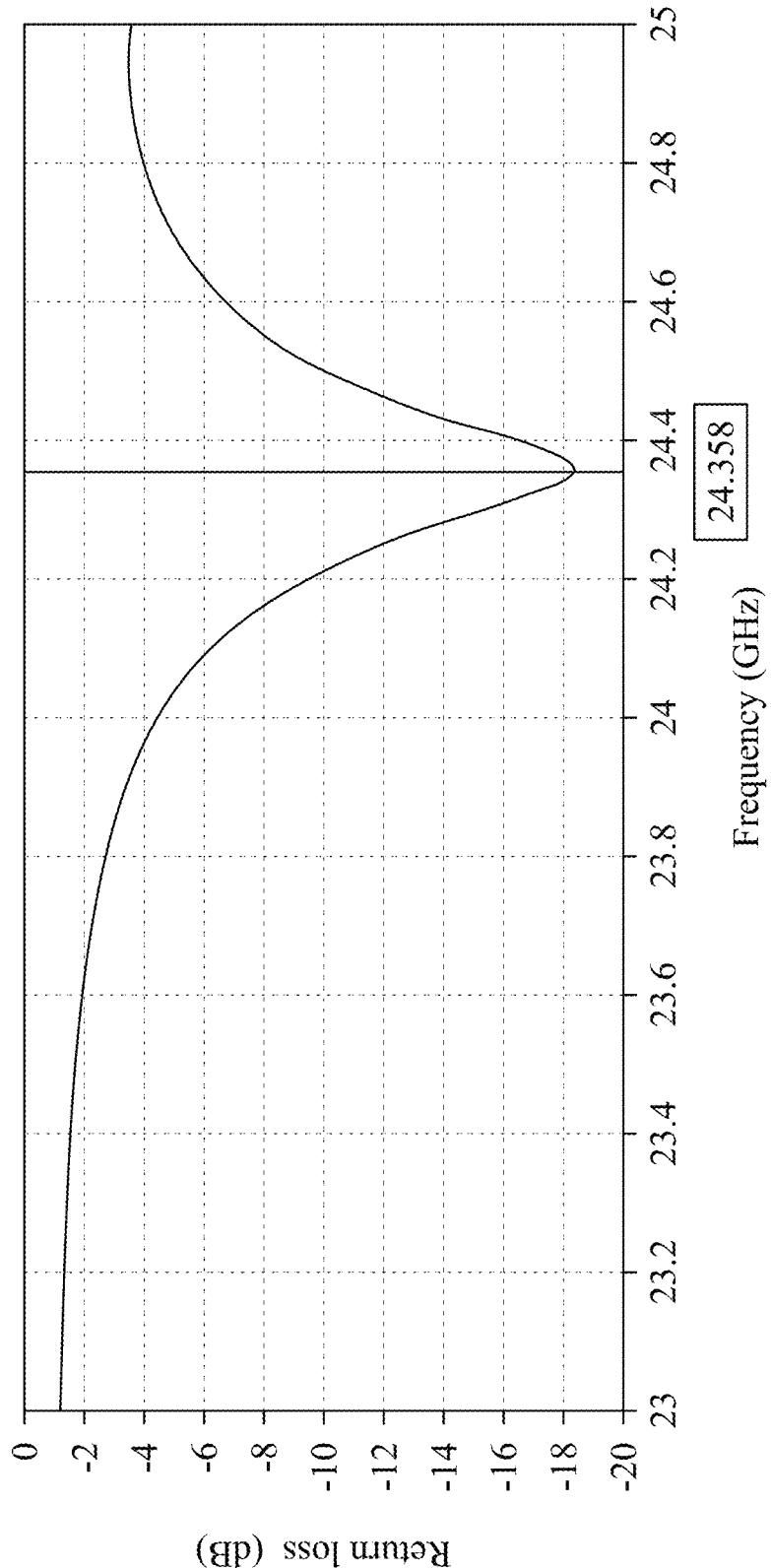
FIG. 7 is a simulated diagram of return loss of the liquid crystal antenna according to at least one embodiment of the present disclosure.

FIG. 7 is a simulated diagram of return loss of the liquid crystal antenna 1A according to at least one embodiment of the present disclosure. Referring to FIG. 7, for example, the thickness of the substrate 210 is 0.5 mm and the relative permittivity of the substrate 210 is 5.33; the thickness of the liquid crystal layer 250 is 0.0075 mm, and the relative permittivity of the liquid crystal layer 250 is 3-4; the thickness of the substrate 220 is 0.2 mm, and the relative permittivity of the substrate 220 is 5.33; the thickness of the adhesive layer 300 is less than 0.1 mm, and the relative permittivity of the adhesive layer 300 is 4; and the thickness of the dielectric layer 110 is 0.254 mm and the relative permittivity of the dielectric layer 110 is 3.66. The return loss of the liquid crystal antenna 1A at 24.358 GHz can reach-18.39 dB.

Referring to FIGS. 4 and 5, in each of the patch antenna units 240, since the electric field radiations generated by the feeding circuit board 100A coupled to the liquid crystal modulation structure 200 have a phase difference of 160-200 degrees, an amplitude with a positive or negative polarity of the electric field radiation can be regulated by applying a bias voltage to one of the patch antennas 241, and the amplitude (with an opposite polarity) of the electric field radiation can be regulated by applying a bias voltage to the other patch antenna 241. For example, the amplitude with the positive polarity can be regulated by applying the bias voltage to the patch antenna 241A, and the amplitude with the negative polarity can be regulated by applying the bias voltage to the patch antenna 241B. The amplitude with the negative polarity can be regulated by applying the bias voltage to the patch antenna 241A, and the amplitude with the positive polarity can be regulated by applying the bias voltage to the patch antenna 241B. In this example, the upper patch antenna 241A is set to regulate the amplitude with positive polarity of the electric field radiation, and the lower patch antenna 241B is set to regulate the amplitude with negative polarity of the electric field radiation.

Figure 8:
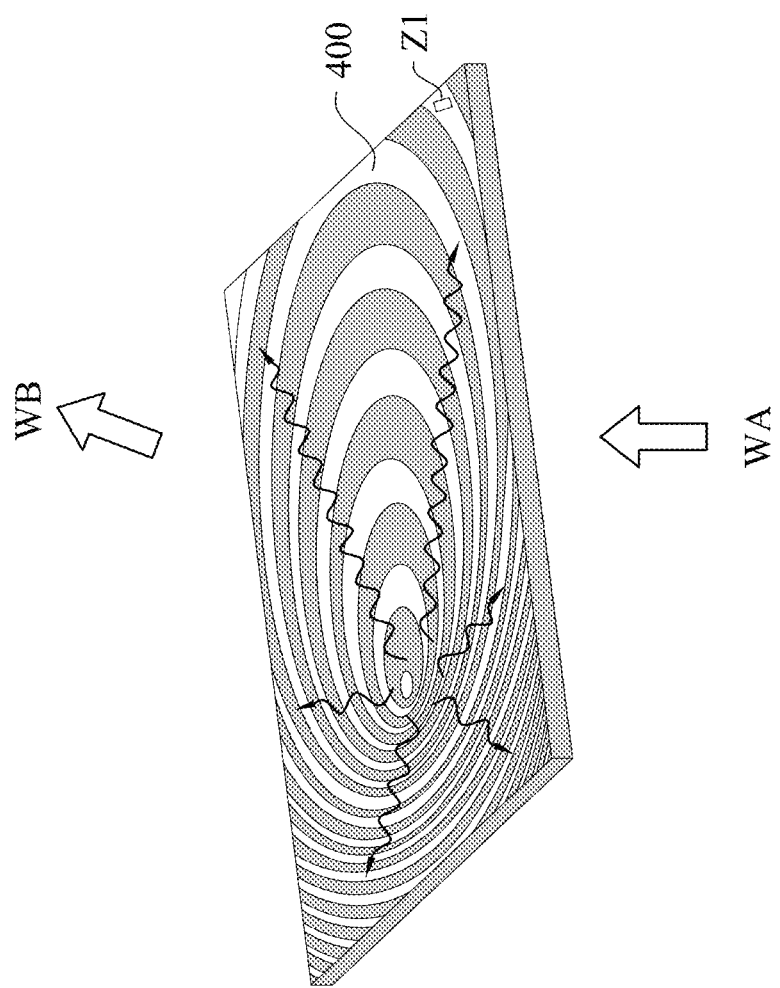
FIG. 8 is a schematic diagram of an amplitude interference pattern formed by the liquid crystal modulation structure of the liquid crystal antenna according to at least one embodiment of the present disclosure.

FIG. 8 is a schematic diagram of an amplitude interference pattern 400 formed by the liquid crystal modulation structure 200 of the liquid crystal antenna 1A according to at least one embodiment of the present disclosure. Referring to FIGS. 1, 4, and 8, the liquid crystal antenna 1A can achieve beamforming of electromagnetic waves by inputting feeding signals and controlling bias voltage applying. First, the feeding circuit board 100A receives the feeding signal to form a feeding electromagnetic wave WA, where the feeding electromagnetic wave WA is divided equally into a plurality of electromagnetic waves by the feeding circuit board 100A. That is, the electromagnetic waves are identical in amplitude and phase, and respectively correspond to the patch antenna units 240. Then, a plurality of bias voltages are applied between the ground plane 230 and the patch antenna units 240, so that the liquid crystal modulation structure 200 integrally forms an amplitude interference pattern 400. Next, interference of the feeding electromagnetic wave WA and the amplitude interference pattern 400 is utilized to form an electromagnetic beam WB, where the electromagnetic beam WB is directed to a specific angle, and the specific angle, for example, is an angle θ of a spherical coordinate angle (hereinafter referred to as angle θ) ranging 0 to 90 degrees, and an angle ϕ of the spherical coordinates angle (hereinafter referred to as angle ϕ) ranging from 0 to 360 degrees.

The specific direction and intensity of the electromagnetic beam WB can be modulated according to the variations of the feeding electromagnetic wave WA and the amplitude interference pattern 400. In detail, the formation of the electromagnetic beam WB can be expressed by the following formula:

$$\varphi_{beam} \approx \varphi_{ref} \cdot \varphi_{pattern} \approx \varphi_{ref} \cdot \varphi_{ref}^* \cdot \varphi_{beam} \approx \varphi_{beam} \quad (1)$$

$$\varphi_{pattern} \approx \varphi_{ref}^* \cdot \varphi_{beam} \quad (2)$$

Where, $\varphi_{beam}$ represents a waveform function of an electromagnetic beam, $\varphi_{ref}$ represents a waveform function of a feeding electromagnetic wave, $\varphi_{pattern}$ represents a function of an amplitude interference pattern, and $\varphi_{ref}^*$ represents a waveform function of a conjugate feeding electromagnetic wave.

As can be seen from the formulas (1) and (2), when the waveform function of the feeding electromagnetic wave is fixed, the regulation of the waveform function of the electromagnetic beam can be determined by varying the function of the amplitude interference pattern, where the regulation of the waveform function of the electromagnetic beam is, for example, the regulation of the intensity and specific angle of the electromagnetic beam WB. Further, the function of the amplitude interference pattern 400 can also be obtained from the waveform function of the conjugate feeding electromagnetic wave and the waveform function of the electromagnetic beam.

Since the waveform function of the feeding electromagnetic wave and the waveform function of the electromagnetic beam involve electromagnetic waves oscillating in the forms of cosine functions, the waveform function of the feeding electromagnetic wave and the waveform function of the electromagnetic beam can be converted into phasors for calculation, as follows:

$$\varphi_{pattern} \approx \varphi_{ref}^* \cdot \varphi_{beam} \approx A_1 e^{-j\phi_{ref}} \cdot A_2 e^{j\phi_{beam}} \approx A_1 A_2 e^{j(\phi_{beam}-\phi_{ref})}$$

$$A_1 A_2 e^{j(\phi_{beam}-\phi_{ref})} \approx A_1 A_2 (\cos(\phi_{beam} - \phi_{ref}) + j\sin(\phi_{beam} - \phi_{ref}))$$

$$\varphi_{pattern} \approx \mathrm{Re}\{A_1 A_2 (\cos(\phi_{beam} - \phi_{ref}) + j\sin(\phi_{beam} - \phi_{ref}))\}$$

$$\varphi_{pattern} \propto \cos(\phi_{beam} - \phi_{ref})$$

Where, A1 and $\varphi_{ref}$ respectively represent the amplitude and phase information of the feeding electromagnetic wave WA, $A_2$ and $\phi_{beam}$ respectively represent the amplitude and phase information of the electromagnetic beam WB, and the phase information of the electromagnetic beam WB can be obtained from a specific angle at which the liquid crystal antenna 1A will radiate.

The intensity of the electromagnetic beam WB can be obtained by substituting the amplitude of the electromagnetic beam WB into a time mean formula of the Poynting vector, as follows:

$$\langle S \rangle = \frac{A_2^2}{2\mu_0 c} = \frac{\varepsilon_0 c}{2} A_2^2$$

Where, (S) represents a time mean of the Poynting vector (that is, the intensity of the electromagnetic beam WB), $\mu_0$, $\varepsilon_0$ and c respectively represent a vacuum permeability, a vacuum permittivity and a velocity of light. The intensity of the electromagnetic beam WB (in watts per square meter) is the energy density of the electromagnetic beam WB, and is proportional to the square of the amplitude of the electromagnetic beam WB. For example, referring to FIGS. 1, 4, and 8, when the liquid crystal antenna 1A is controlled to radiate the electromagnetic beam WB at an angle θ of 20 degrees and an angle ϕ of 60 degrees, the function of the amplitude interference pattern 400 can be obtained from regulating the phase information $\phi_{ref}$ of the electromagnetic wave WA at an angle θ of 0 degree and an angle ϕ of 0 degree (the phase information of the feeding electromagnetic wave WA formed by the feeding circuit board 100A), and the phase information $\phi_{beam}$ of the electromagnetic beam WB at an angle θ of 20 degrees and an angle ϕ of 60 degrees.

After the amplitude interference pattern 400 is obtained, the bias voltage between each of the patch antenna units 240 and the ground plane 230 is regulated according to the function of the amplitude interference pattern and the locations of the patch antenna units 240 corresponding to the amplitude interference pattern 400. In FIG. 8, a white-colored location shown in the amplitude interference pattern 400 indicates that the electromagnetic wave energy can be completely radiated, and the intensity of the electromagnetic wave energy is larger; a gray-colored location in the amplitude interference pattern 400 indicates that part of the electromagnetic wave energy is radiated, and the intensity of the electromagnetic wave energy decreases.

For example, the lower right zone $z_1$ in the amplitude interference pattern 400 corresponds to a patch antenna unit 240 at the lower right of FIG. 3, the function of the amplitude interference pattern corresponding the function value is 1 where is shown in white in the lower right zone $z_1$ (the electromagnetic wave energy can be completely radiated), so the bias voltage between the patch antenna unit 240 and the ground plane 230 can be regulated to enable the electromagnetic wave energy to be completely radiated. In addition, since the function value of the lower right zone $z_1$ is positive, a bias voltage is applied to the upper patch antenna 241 of the patch antenna unit 240 and the ground plane 230 to regulate the amplitude with the positive polarity of the electric field radiation. Conversely, when the function value corresponding to the lower right zone $z_1$ is negative, a bias voltage is applied to the lower patch antenna 241 of the patch antenna unit 240 and the ground plane 230 to regulate the amplitude with the negative polarity of the electric field radiation.

Since the function of the amplitude interference pattern is a cosine function, the function values include positive and negative values. By applying a bias voltage to the upper patch antenna 241 or the lower patch antenna 241, the liquid crystal modulation structure 200 can be completely regulated according to the function of the amplitude interference pattern. It should be added that the amplitude interference pattern 400 in FIG. 8 is only for a schematic purpose and does not show the change of gray scales, but the intensity of the electromagnetic wave energy in the amplitude interference pattern 400 can be distributed in a gradual change manner. Thus, the electromagnetic wave energy may have more than two intensities at different locations in the amplitude interference pattern 400.

Figure 9:
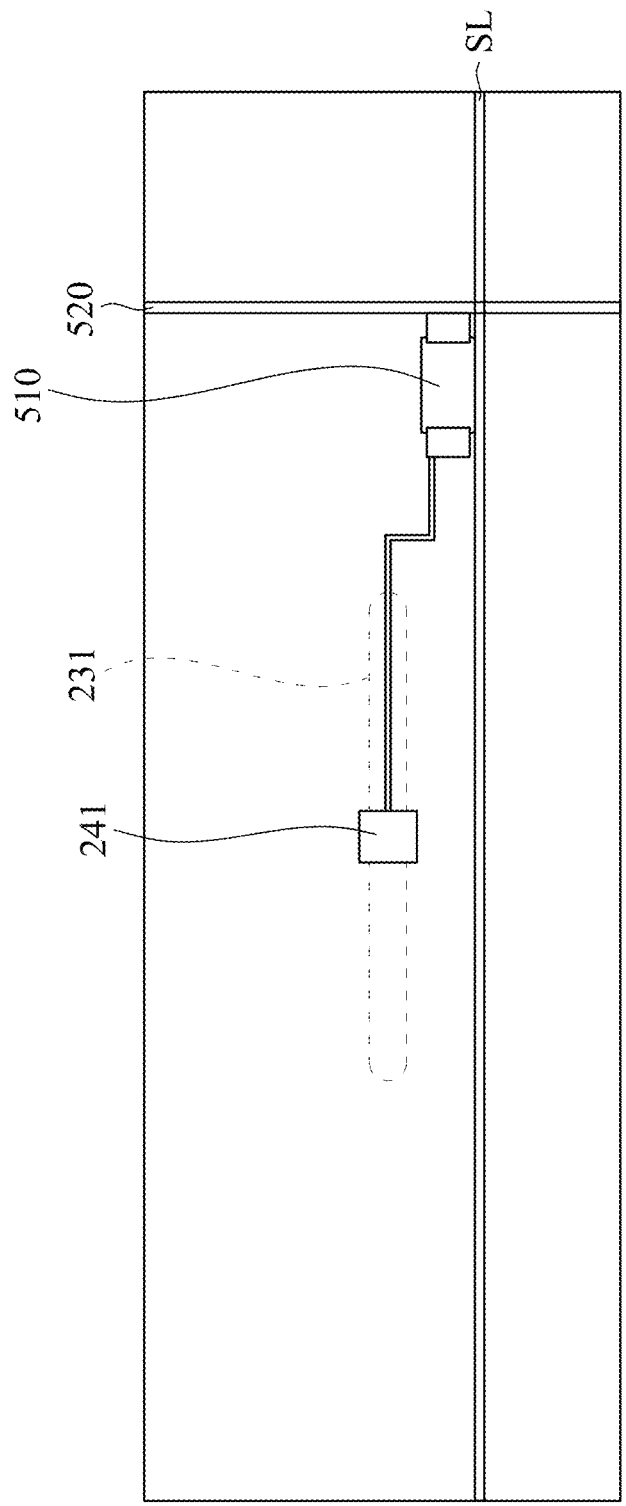
FIG. 9 is a schematic diagram of the patch antenna, a transistor and a bias trace of the liquid crystal antenna according to at least one embodiment of the present disclosure.

FIG. 9 is a schematic diagram of the patch antenna 241, a transistor 510 and a bias trace 520 of the liquid crystal antenna 1A according to at least one embodiment of the present disclosure. Referring to FIGS. 1 and 9, in some embodiments, the liquid crystal antenna 1A further includes a plurality of transistors 510 and a plurality of bias traces 520. Gates of the transistors 510 are electrically connected to scanning lines SL respectively. Drains of the transistors 510 are electrically connected to the patch antennas 241 respectively. Sources of the transistors 510 are electrically connected to the bias traces 520 (equivalent to data lines of a LCD panel) respectively. Thus, when the bias voltage of any one of the patch antenna units 240 is regulated, the transistor 510 corresponding to the patch antenna 241 to which the bias voltage is applied can be turned on, and the bias voltage is transmitted to the corresponding patch antenna 241 through the bias trace 520.

Figure 10:
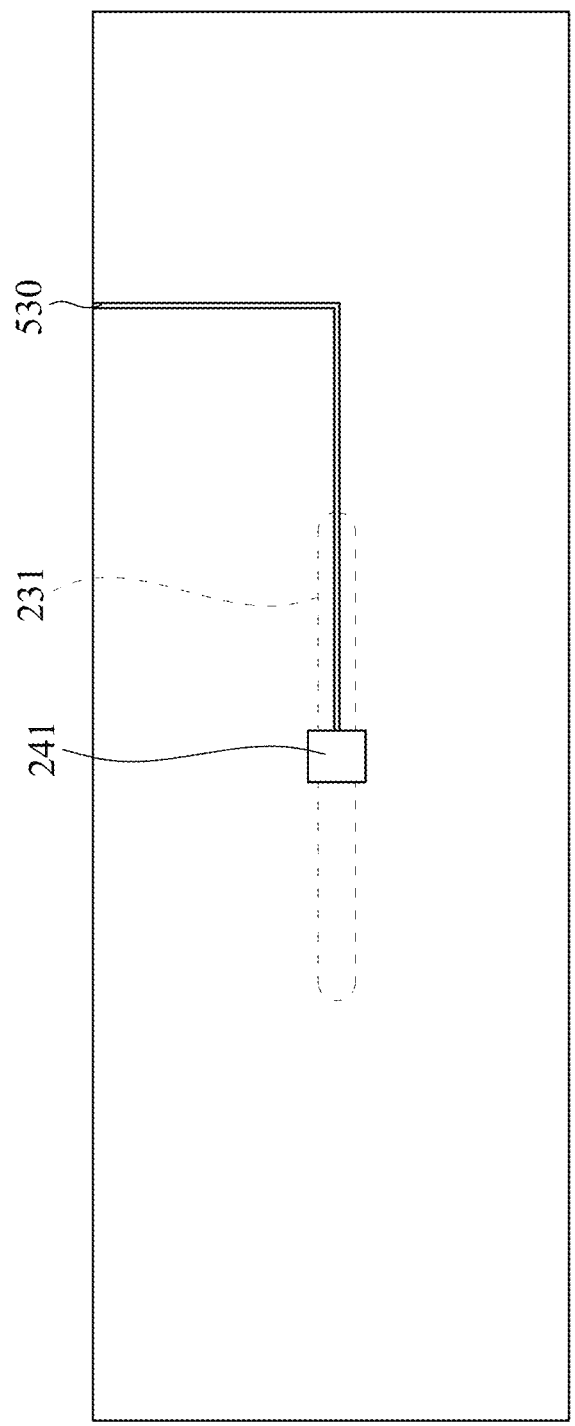
FIG. 10 is a schematic diagram of the patch antenna and the bias trace of the liquid crystal antenna according to at least one embodiment of the present disclosure.

FIG. 10 is a schematic diagram of the patch antenna 241 and a bias trace 530 of the liquid crystal antenna 1A according to at least one embodiment of the present disclosure. Referring to FIGS. 1 and 10, in some embodiments, the liquid crystal antenna 1A further includes a plurality of bias traces 530. The bias traces 530 are electrically connected to the patch antennas 241 respectively. Thus, the bias voltages can be directly transmitted to the corresponding patch antennas 241 via the bias traces 530, thereby regulating the bias voltage of any one of the patch antenna units 240.

Figure 11:
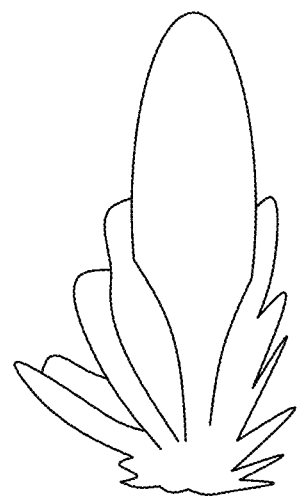
FIG. 11 is a two-dimensional vertical sectional field pattern of the liquid crystal antenna when an electromagnetic beam is radiated at an angle $\theta$ of 0 degree and an angle $\phi$ of 0 degree according to at least one embodiment of the present disclosure.
Figure 12:
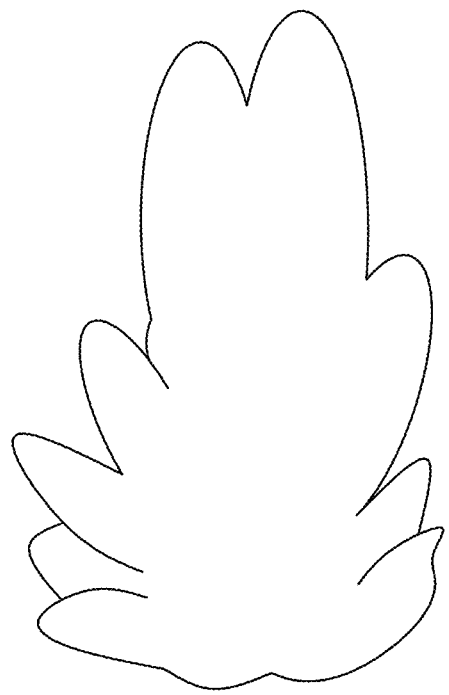
FIG. 12 is a two-dimensional vertical sectional field pattern of the liquid crystal antenna when an electromagnetic beam is radiated at an angle $\theta$ of 10 degrees and an angle $\phi$ of 0 degree according to at least one embodiment of the present disclosure.

FIG. 11 is a two-dimensional vertical sectional field pattern of the liquid crystal antenna 1A when an electromagnetic beam is radiated at an angle θ of 0 degree and an angle ϕ of 0 degree according to at least one embodiment of the present disclosure; and FIG. 12 is a two-dimensional vertical sectional field pattern of the liquid crystal antenna 1A when an electromagnetic beam is radiated at an angle θ of 10 degrees and an angle ϕ of 0 degree according to at least one embodiment of the present disclosure. The liquid crystal antenna 1A operates at 24.1 GHz. In FIG. 11, a main beam has a gain of 10.8 dBi. In FIG. 12, a dual-beam has a gain of 5.8 dBi.

Figure 13:
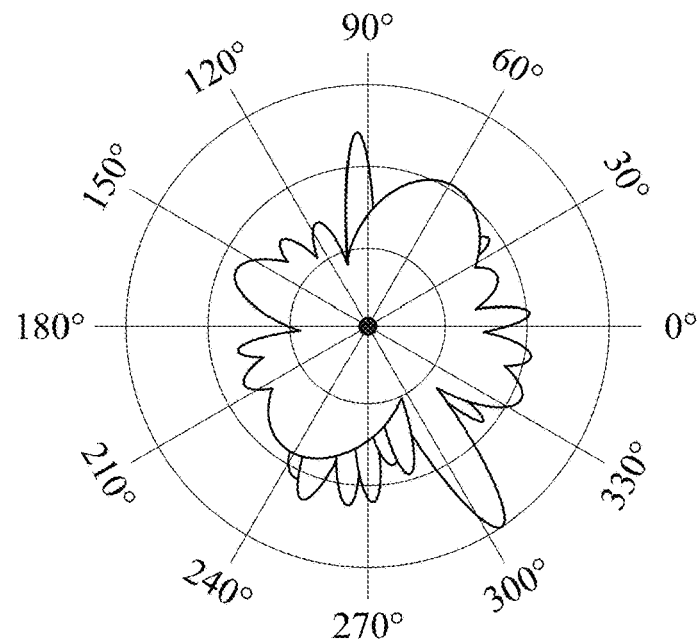
FIG. 13 is a two-dimensional horizontal sectional field pattern of the liquid crystal antenna when an electromagnetic beam is radiated at an angle $\theta$ of 20 degrees and an angle $\phi$ of 60 degrees according to at least one embodiment of the present disclosure.
Figure 14:
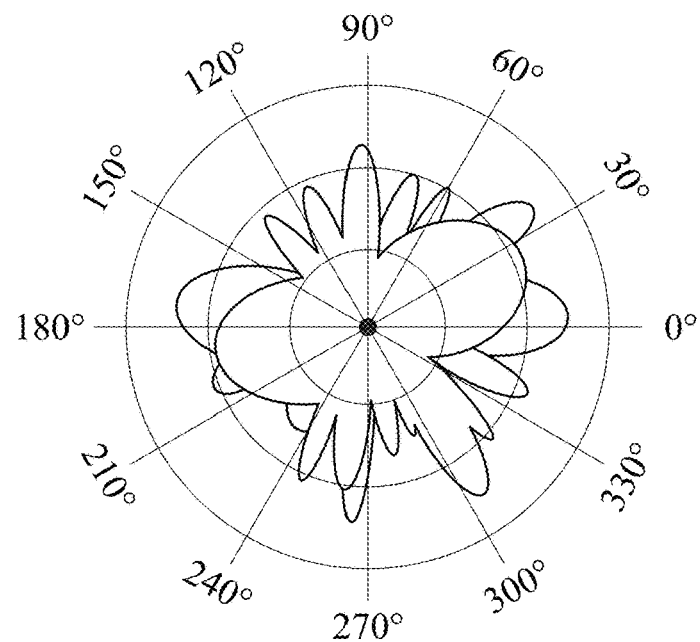
FIG. 14 is a two-dimensional horizontal sectional field pattern of the liquid crystal antenna when an electromagnetic beam is radiated at an angle $\theta$ of 20 degrees and an angle $\phi$ of 30 degrees according to at least one embodiment of the present disclosure.

FIG. 13 is a two-dimensional horizontal sectional field pattern of the liquid crystal antenna 1A when an electromagnetic beam is radiated at an angle θ of 20 degrees and an angle ϕ of 60 degrees according to at least one embodiment of the present disclosure; and FIG. 14 is a two-dimensional horizontal sectional field pattern of the liquid crystal antenna 1A when an electromagnetic beam is radiated at an angle θ of 20 degrees and an angle ϕ of 30 degrees according to at least one embodiment of the present disclosure. The liquid crystal antenna 1A also operates at 24.1 GHz. In FIG. 13, the dual-beam has a gain of 6.3 dBi. In FIG. 14, the dual-beam has a gain of 5.8 dBi. As can be seen from the above field patterns, the liquid crystal antenna 1A can indeed be controlled to achieve beamforming of electromagnetic waves, and formed dual-beams can quickly scan.

Figure 15:
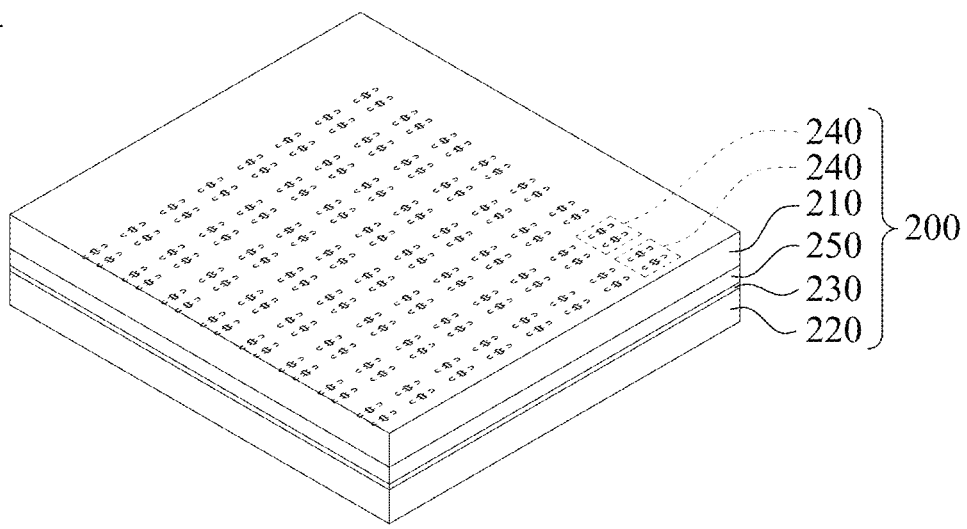
FIG. 15 is a stereoscopic exploded view of a liquid crystal antenna according to another embodiment of the present disclosure.
Figure 15:
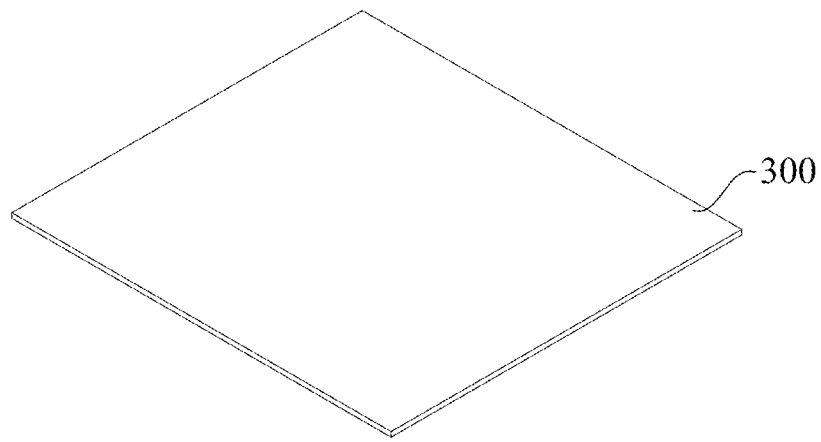
Figure 15:
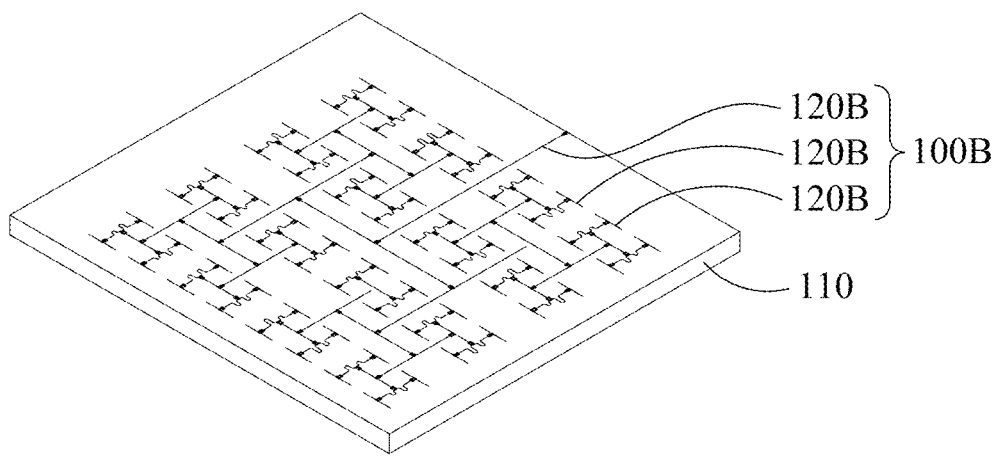
Figure 16:
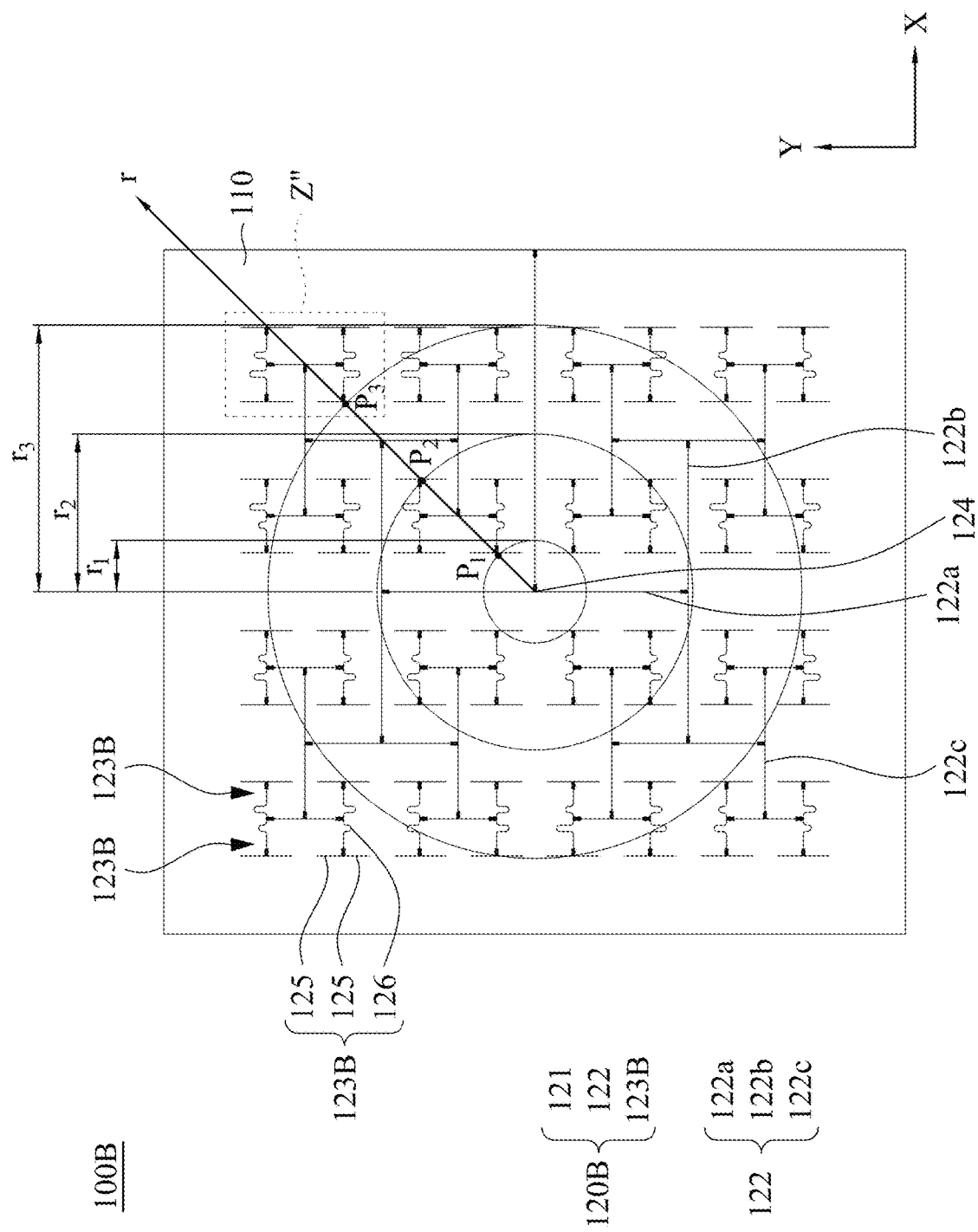
FIG. 16 is a top view of a feeding circuit board in FIG. 15.

FIG. 15 is a stereoscopic exploded view of a liquid crystal antenna 1B according to another embodiment of the present disclosure; and FIG. 16 is a top view of a feeding circuit board 100B in FIG. 15. Referring to FIGS. 15 and 16, the liquid crystal antenna 1B in FIG. 15 is similar to the liquid crystal antenna 1A in FIG. 1, where components that are identical or similar in function in the two are represented by same reference numerals. A difference between the two is that the feeding circuit board 100B of the liquid crystal antenna 1B is different from the feeding circuit board 100A of the liquid crystal antenna 1A. In traces 120B of the feeding circuit board 100B, each of third traces 123B has two branches 125 and a curved segment 126, where the curved segment 126 is connected to the corresponding second trace 122, and the branches 125 are connected to the curved segment 126. Transmission paths of the branches 125 of each of the third traces 123A to transmit a feeding signal are also identical in length, and the extension directions of the branches 125 are parallel to the electric field direction of the feeding electromagnetic wave.

Figure 17:
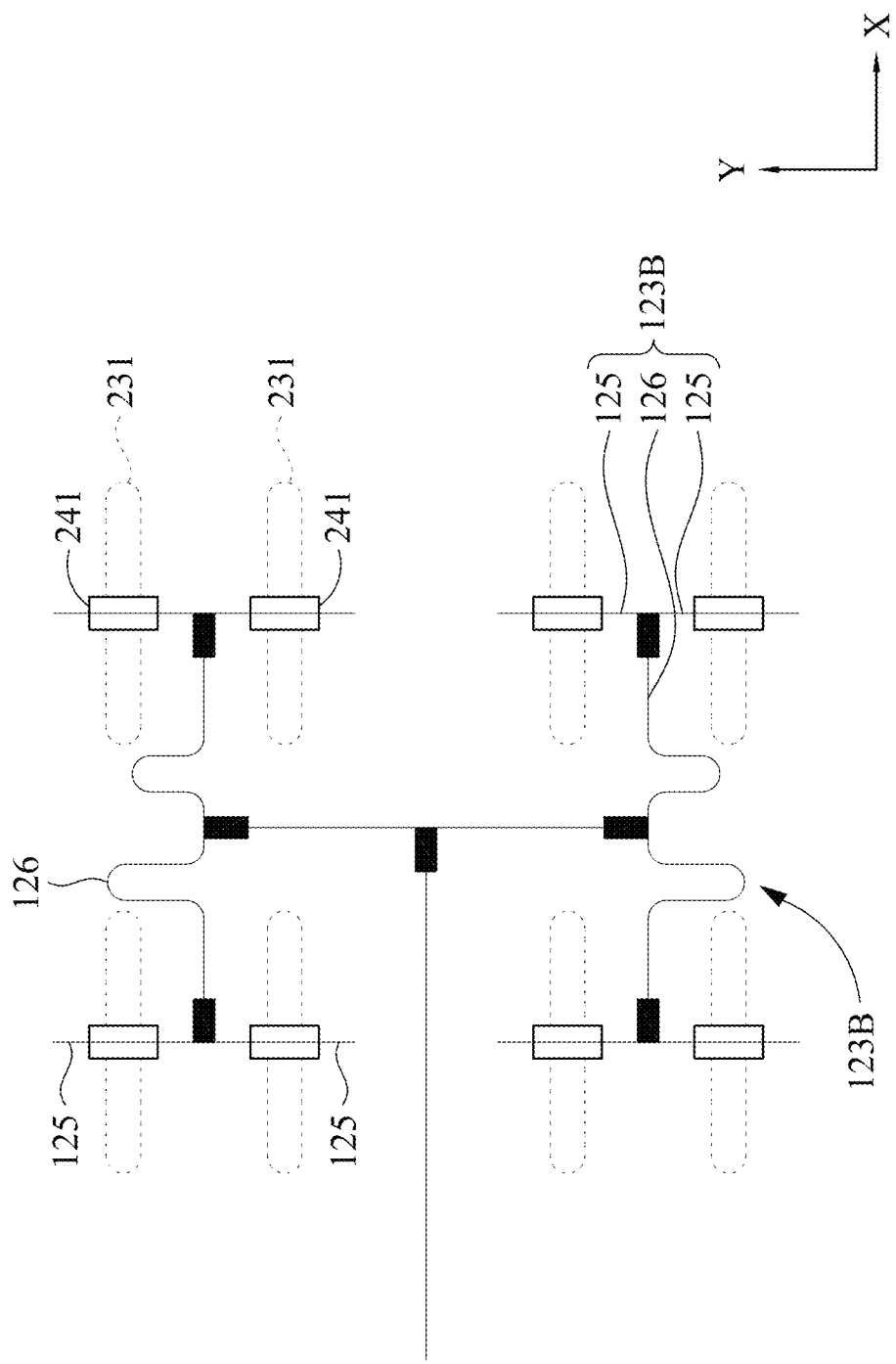
FIG. 17 is a schematic diagram of an overlap between an area Z" of the feeding circuit board in FIG. 16 and the area Z' of the liquid crystal modulation structure in FIG. 3.

FIG. 17 is a schematic diagram of an overlap between a zone Z" of the feeding circuit board 100B in FIG. 16 and an area Z' of the liquid crystal modulation structure 200 in FIG. 3. Referring to FIGS. 15-17, the transmission paths of the curved segments 126 of part of the third traces 123B are identical in length, so that the branch signals transmitted in the feeding transmission paths that are identical in length respectively form electromagnetic waves that are identical in amplitude and phase. In this example, the length of each of the feeding transmission paths is proportional to a radius distance r between the tail end of the feeding transmission path and the feeding point 124. Therefore, when the feeding point 124 is a center of a circle, the tail ends of part of the feeding transmission paths correspond to the same radius distance r, so that the branch signals transmitted in this part of the feeding transmission paths respectively form electromagnetic waves that are identical in amplitude and phase. For example, the formed electromagnetic waves corresponding to a radius distance r that is a distance $r_1$ are identical in amplitude and phase. The formed electromagnetic waves corresponding to a radius distance r that is a distance $r_2$, are identical in amplitude and phase. The formed electromagnetic waves corresponding to a radius distance r that is a distance $r_3$ are identical in amplitude and phase.

In addition, the electromagnetic waves corresponding to different radius distances r form phase delays. The wave fronts of the electromagnetic waves forming concentric circles centered on the feeding point 124 are transmitted outward from the feeding point 124, where the farther the concentric circle is away from the feeding point 124, the greater the phase delay with respect to the feeding point 124 is. For example, the phase of the electromagnetic wave formed at an end point $P_1$ is $\phi_{11}$, and the phase of the electromagnetic wave formed at an end point $P_2$ is $\phi_{21}$. The two correspond to a same central angle, but the formed phase delay is proportional to $$2\pi(r_2 - r_1)/\lambda_g$$

where $\lambda_g$ is the wavelength of the feeding electromagnetic wave.

A function of an amplitude interference pattern of a liquid crystal modulation structure corresponding to the liquid crystal antenna 1B can also be obtained from the waveform function of the conjugate feeding electromagnetic wave and the waveform function of the electromagnetic beam, as described in formula (2) above. For example, when the liquid crystal antenna 1B is controlled to radiate the electromagnetic beam WB at an angle θ of 20 degrees and an angle ϕ of 60 degrees, the function of the amplitude interference pattern can be obtained by regulating the phase information $\phi_{ref}$ of the electromagnetic wave WA at an angle θ of 0 degree and an angle ϕ of 0-360 degrees (the phase information of the feeding electromagnetic wave formed by the feeding circuit board 100B), and the phase information $\phi_{beam}$ of the electromagnetic beam at an angle θ of 20 degree and an angle ϕ of 60 degree.

Figure 18:
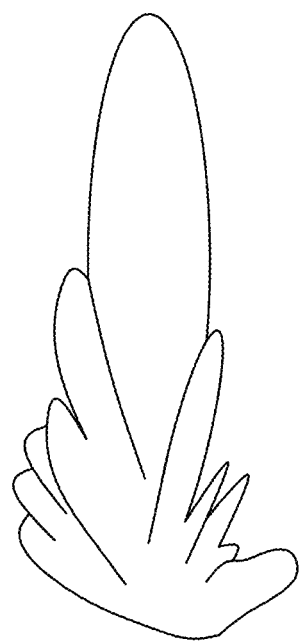
FIG. 18 is a two-dimensional vertical sectional field pattern of the liquid crystal antenna when an electromagnetic beam is radiated at an angle θ of 0 degree and an angle φ of 0 degree according to another embodiment of the present disclosure.
Figure 19:
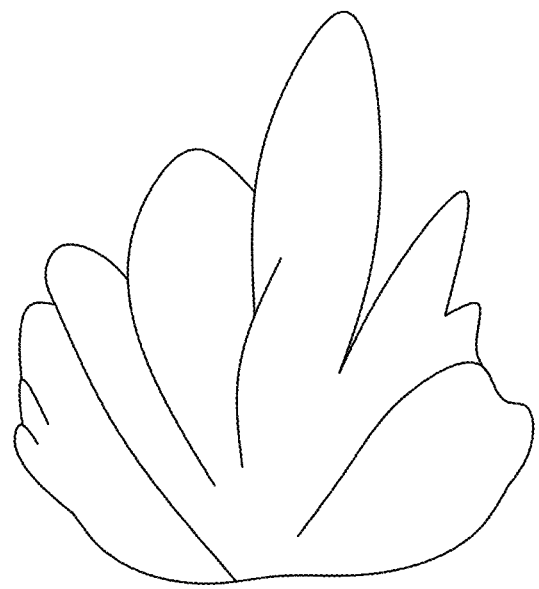
FIG. 19 is a two-dimensional vertical sectional field pattern of the liquid crystal antenna when an electromagnetic beam is radiated at an angle θ of 10 degrees and an angle φ of 0 degree according to another embodiment of the present disclosure.

FIG. 18 is a two-dimensional vertical sectional field pattern of the liquid crystal antenna 1B when an electromagnetic beam is radiated at an angle θ of 0 degree and an angle ϕ of 0 degree according to another embodiment of the present disclosure; and FIG. 19 is a two-dimensional vertical sectional field pattern of the liquid crystal antenna 1B when an electromagnetic beam is radiated at an angle θ of 10 degrees and an angle ϕ of 0 degree according to another embodiment of the present disclosure. The liquid crystal antenna 1B also operates at 24.1 GHZ. In FIG. 18, a main beam has a gain of 12.6 dBi. In FIG. 19, a main beam has a gain of 5.0 dBi.

Figure 20:
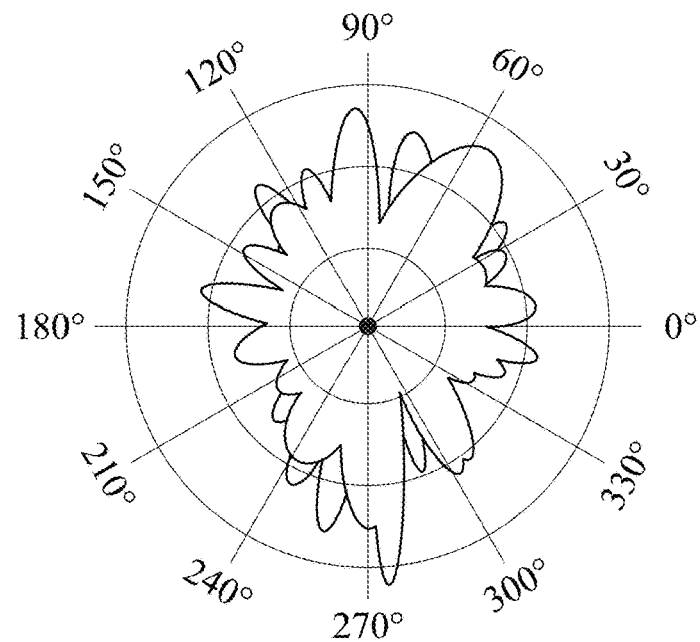
FIG. 20 is a two-dimensional horizontal sectional field pattern of the liquid crystal antenna when an electromagnetic beam is radiated at an angle θ of 20 degrees and an angle φ of 60 degrees according to another embodiment of the present disclosure.
Figure 21:
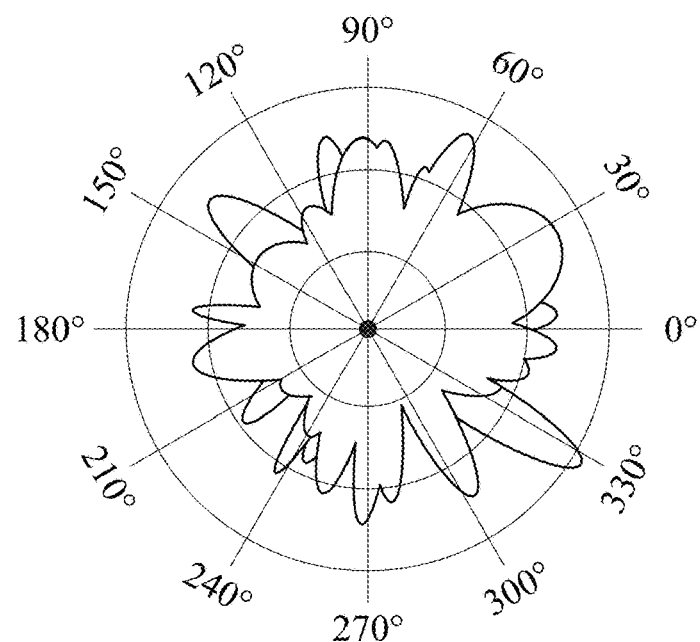
FIG. 21 is a two-dimensional horizontal sectional field pattern of the liquid crystal antenna when an electromagnetic beam is radiated at an angle θ of 20 degrees and an angle φ of 30 degrees according to another embodiment of the present disclosure.

FIG. 20 is a two-dimensional horizontal sectional field pattern of the liquid crystal antenna 1B when an electromagnetic beam is radiated at an angle θ of 20 degrees and an angle ϕ of 60 degrees according to another embodiment of the present disclosure; and FIG. 21 is a two-dimensional horizontal sectional field pattern of the liquid crystal antenna 1B when an electromagnetic beam is radiated at an angle θ of 20 degrees and an angle ϕ of 30 degrees according to another embodiment of the present disclosure. The liquid crystal antenna 1B also operates at 24.1 GHZ. In FIG. 20, a main beam has a gain of 4.5 dBi. In FIG. 21, a main beam has a gain of 5.7 dBi. As can be seen from the above field patterns, the liquid crystal antenna 1B can indeed be controlled to achieve beamforming of electromagnetic waves, and only a single main beam is formed for accurate scanning.

In summary, the liquid crystal antennas disclosed in the above embodiments can be controlled to achieve beamforming of electromagnetic waves to scan accurately or rapidly in a direction of a specific angle. Through the combination of the feeding circuit board and the liquid crystal modulation structure, the volume reduction of the liquid crystal antenna is facilitated, and the use of a standard manufacturing process for a liquid crystal display to make an array antenna is also facilitated.

Although the present disclosure has been disclosed in embodiments hereinabove, the embodiments are not intended to limit the present disclosure, some changes and modification may be made by those of ordinary skill in the art without departing from the spirit and scope of the present disclosure, therefore, the scope of protection of the present disclosure shall be defined in the attached claims.

What is claimed is:
1. A liquid crystal antenna, comprising:
   a feeding circuit board, comprising a plurality of traces, the traces forming a plurality of feeding transmission paths; and
   a liquid crystal modulation structure, disposed on the feeding circuit board, and comprising:
      a ground plane, disposed adjacent to the feeding circuit board and comprising a plurality of slotted holes;
      a plurality of patch antenna units, each comprising two patch antennas that overlap the slotted holes respectively in a vertical projection direction of the ground plane and corresponding to the feeding transmission paths respectively, wherein in each of the patch antenna units, two feeding transmission paths corresponding to the two patch antennas extend in opposite directions to their respective tail ends, and the two feeding transmission paths are identical in length; and
      a liquid crystal layer, disposed between the ground plane and the patch antenna units, and having a liquid crystal dielectric value varying according to a voltage difference between each of the patch antenna units and the ground plane;
   wherein when the feeding circuit board receives a feeding signal to form a feeding electromagnetic wave and the patch antenna units receive a plurality of bias voltages respectively so that the liquid crystal modulation structure forms an amplitude interference pattern, energy of the feeding signal is coupled to the liquid crystal modulation structure so that the feeding electromagnetic wave and the amplitude interference pattern interfere to form an electromagnetic beam, where the electromagnetic beam is directed to a specific angle, and an intensity and the specific angle of the electromagnetic beam are modulated according to variations of the feeding electromagnetic wave and the amplitude interference pattern.

2. The liquid crystal antenna according to claim 1, wherein in each of the patch antenna units, a center distance is present between centers of the patch antennas, the electromagnetic beam has a wavelength, and the center distance is 0.25-0.35 times the wavelength.

3. The liquid crystal antenna according to claim 1, wherein the patch antenna units are arranged above the ground plane in a first direction and a second direction perpendicular to the first direction, where a unit center distance is present between centers of adjacent two of the patch antenna units, the electromagnetic beam has a wavelength, and the unit center distance is 0.5-0.8 times the wavelength.

4. The liquid crystal antenna according to claim 3, wherein the slotted holes are arranged in the first direction and the second direction; each of the slotted holes is rectangular, and a length of an edge, parallel to the first direction, of each of the slotted holes is 0.138-0.169 times the wavelength and a length of an edge, parallel to the second direction, of each of the slotted holes is 0.016-0.021 times the wavelength; and each of the patch antennas is rectangular and overlaps a center of a corresponding one of the slotted holes, and a length of an edge, parallel to the first direction, of each of the patch antennas is 0.013-0.018 times the wavelength and a length of an edge, parallel to the second direction, of each of the patch antennas is 0.025-0.032 times the wavelength.

5. The liquid crystal antenna according to claim 1, wherein the traces include a first trace, a plurality of second traces and a plurality of third traces, where the first trace extends from a boundary of the feeding circuit board to a feeding point of the feeding circuit board, one end of each of the second traces is connected to the first trace from the feeding point, each of the second traces extends at least partially in a direction away from the feeding point, and other end of each of the second traces is connected to two of the third traces, and each of the third traces has two branches to form tail ends of the two feeding transmission paths, and corresponds to one of the patch antenna units, where transmission paths of the two branches of each of the third traces are identical in length.

6. The liquid crystal antenna according to claim 5, wherein transmission paths of the second traces are identical in length, and transmission paths of the third traces are identical in length, the feeding transmission paths are identical in length, the feeding signal is divided into a plurality of branch signals through the feeding transmission paths, the branch signals form a plurality of electromagnetic waves respectively, and the electromagnetic waves are identical in amplitude and phase.

7. The liquid crystal antenna according to claim 5, wherein transmission paths of the second traces are identical in length, and each of the third traces further has a curved segment, where the curved segment is connected to the corresponding second trace, and the branches are connected to the curved segment; a length of each of the feeding transmission paths is proportional to a radius distance between the tail end of the feeding transmission path and the feeding point; and the feeding signal is divided into a plurality of branch signals through the feeding transmission paths, the branch signals form a plurality of electromagnetic waves respectively, and in the feeding transmission paths, the electromagnetic waves formed corresponding to the radius distances that are identical in length are identical in amplitude and phase.

8. The liquid crystal antenna according to claim 1, further comprising a plurality of transistors and a plurality of bias traces, where the transistors are electrically connected to the patch antennas and the bias traces respectively, and the bias voltages are transmitted to the corresponding patch antenna units respectively through at least part of the bias traces and at least part of the transistors that are turned on.

9. The liquid crystal antenna according to claim 1, further comprising a plurality of bias traces, the bias traces are electrically connected to the patch antennas respectively, and the bias voltages are transmitted to the corresponding patch antenna units respectively through at least part of the bias traces.

* * * * *